United States Patent
Shimada

(10) Patent No.: US 11,961,680 B2
(45) Date of Patent: Apr. 16, 2024

(54) CERAMIC ELECTRONIC COMPONENT WITHOUT EXTERNAL ELECTRODES ON TOP SURFACE, SUBSTRATE ARRANGEMENT INCLUDING THE SAME, AND METHOD OF MANUFACTURING SUCH CERAMIC ELECTRONIC COMPONENT

(71) Applicant: TAIYO YUDEN CO., LTD., Tokyo (JP)

(72) Inventor: Takashi Shimada, Tokyo (JP)

(73) Assignee: TAIYO YUDEN CO., LTD., Tokyo (JP)

( * ) Notice: Subject to any disclaimer, the term of this patent is extended or adjusted under 35 U.S.C. 154(b) by 0 days.

(21) Appl. No.: 17/518,489

(22) Filed: Nov. 3, 2021

(65) Prior Publication Data

US 2022/0172900 A1 Jun. 2, 2022

(30) Foreign Application Priority Data

Nov. 27, 2020 (JP) .................................. 2020-196755

(51) Int. Cl.
*H01G 4/30* (2006.01)
*C04B 35/64* (2006.01)
(Continued)

(52) U.S. Cl.
CPC ............... *H01G 4/30* (2013.01); *H01G 2/065* (2013.01); *H01G 4/008* (2013.01); *H01G 4/012* (2013.01); *H01G 4/1209* (2013.01); *C04B 35/64* (2013.01)

(58) Field of Classification Search
CPC .......... H01G 4/30; H01G 2/065; H01G 4/008; H01G 4/012; H01G 4/1209; C04B 35/64
See application file for complete search history.

(56) References Cited

U.S. PATENT DOCUMENTS

| 2003/0222335 A1* | 12/2003 | Hirano | ................. H05K 3/3442 |
| | | | 257/E29.022 |
| 2005/0157478 A1* | 7/2005 | Inagaki | ................. H01L 25/162 |
| | | | 257/E23.079 |

(Continued)

FOREIGN PATENT DOCUMENTS

| JP | 2003-17324 A | 3/2003 |
| JP | 2008-135781 A | 6/2008 |

(Continued)

OTHER PUBLICATIONS

Japanese Office Action dated Feb. 20, 2024, in a counterpart Japanese patent application No. 2020-196755. (A machine translation (not reviewed for accuracy) attached.)

*Primary Examiner* — David M Sinclair
*Assistant Examiner* — Daniel M Dubuisson
(74) *Attorney, Agent, or Firm* — CHEN YOSHIMURA LLP

(57) ABSTRACT

A ceramic electronic component includes an element body and at least one external electrode. The element body includes a dielectric and at least one internal electrode therein. The element body has a plurality of surfaces that includes a first surface and a second surface opposite the first surface. Two end regions are defined on the second surface at opposite ends of the second surface, and an intermediate region is defined on the second surface between the two end regions. The intermediate region has a surface roughness smaller than each of the two end regions. The respective external electrode is formed on the element body at a position away from the second surface. The respective external electrode includes a base layer formed on the element body and a plating layer formed on the base layer. The base layer is connected to the respective internal electrode and contains at least one metal.

20 Claims, 20 Drawing Sheets

(51) Int. Cl.
*H01G 2/06* (2006.01)
*H01G 4/008* (2006.01)
*H01G 4/012* (2006.01)
*H01G 4/12* (2006.01)

(56) References Cited

U.S. PATENT DOCUMENTS

| | | | |
|---|---|---|---|
| 2013/0182369 A1* | 7/2013 | Jeon | H01G 4/30 |
| | | | 156/89.12 |
| 2014/0318841 A1 | 10/2014 | Kim et al. | |
| 2016/0042868 A1* | 2/2016 | Otsuka | H01G 4/248 |
| | | | 361/301.4 |
| 2017/0040112 A1* | 2/2017 | Tanaka | H01G 4/232 |
| 2017/0250028 A1* | 8/2017 | Makino | H01G 4/005 |
| 2018/0218839 A1 | 8/2018 | Watabe et al. | |
| 2018/0218840 A1* | 8/2018 | Watabe | H01G 4/30 |
| 2019/0035758 A1* | 1/2019 | Hwang | H01L 24/82 |
| 2019/0180938 A1* | 6/2019 | Tahara | H01G 4/248 |
| 2019/0287720 A1* | 9/2019 | Mori | H01G 4/12 |
| 2019/0318872 A1* | 10/2019 | Mizuno | H01G 4/012 |
| 2019/0355524 A1 | 11/2019 | Ueda | |
| 2020/0027662 A1 | 1/2020 | Suga et al. | |
| 2020/0105475 A1* | 4/2020 | Lee | H01G 4/232 |
| 2020/0126729 A1* | 4/2020 | Mizukami | H01G 4/12 |
| 2020/0152390 A1* | 5/2020 | Yeon | H01G 4/012 |
| 2020/0312560 A1* | 10/2020 | Onishi | H01G 4/232 |
| 2021/0035741 A1* | 2/2021 | Cho | H01G 4/008 |
| 2021/0082623 A1* | 3/2021 | Kim | H01G 4/224 |
| 2021/0082624 A1* | 3/2021 | Kim | H01G 4/224 |
| 2021/0210285 A1* | 7/2021 | Sasabayashi | H01G 4/2325 |
| 2021/0280375 A1 | 9/2021 | Suga et al. | |
| 2022/0093331 A1* | 3/2022 | Shimada | H01G 4/30 |

FOREIGN PATENT DOCUMENTS

| | | |
|---|---|---|
| JP | 2014-216637 A | 11/2014 |
| JP | 2018-121010 A | 8/2018 |
| JP | 2019-21927 A | 2/2019 |
| JP | 2020-13846 A | 1/2020 |
| KR | 20170130290 A * | 11/2017 |
| WO | 2018/151025 A1 | 8/2018 |

* cited by examiner

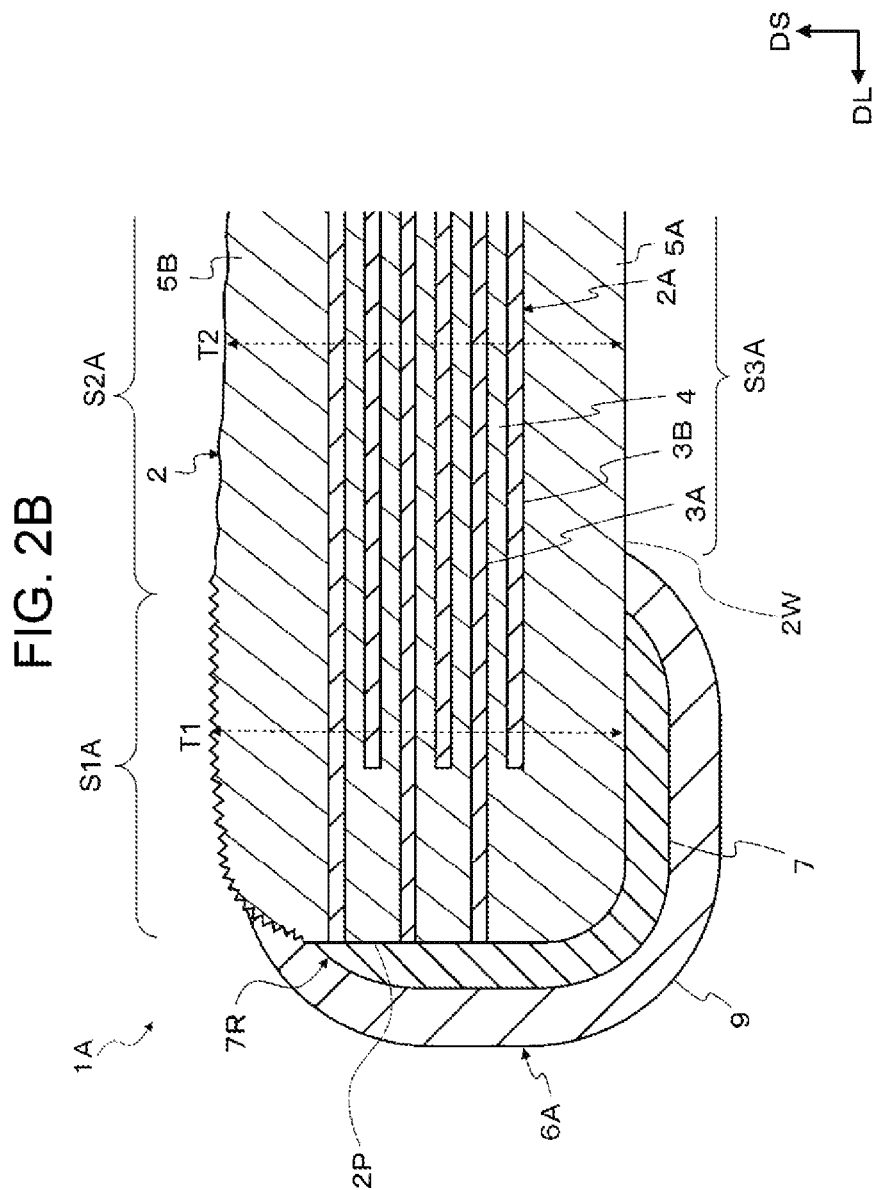

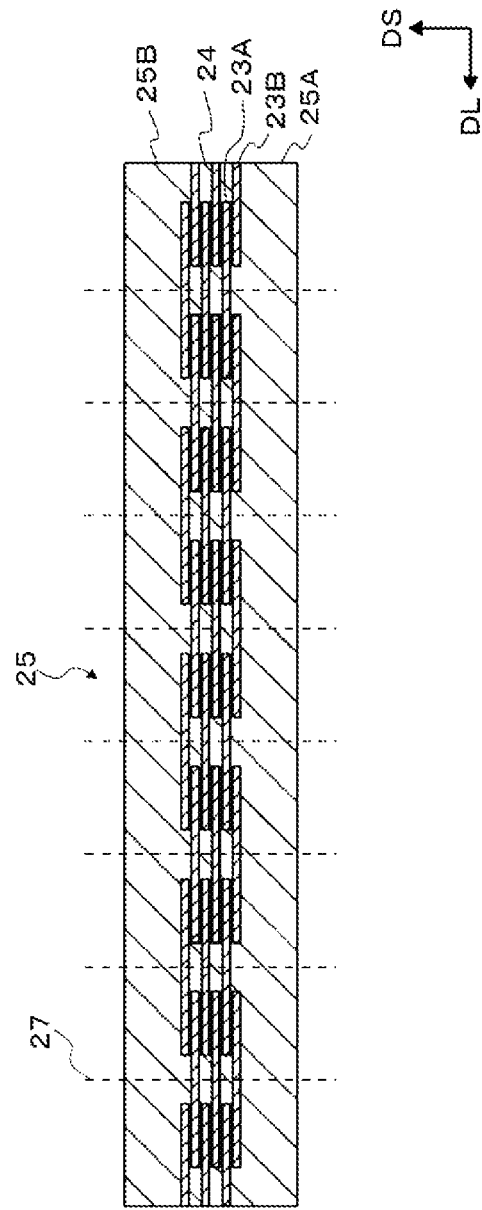

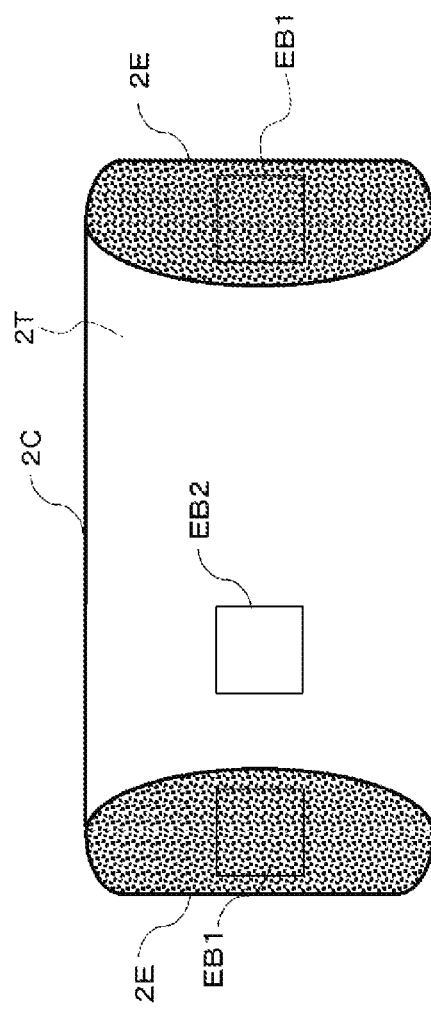

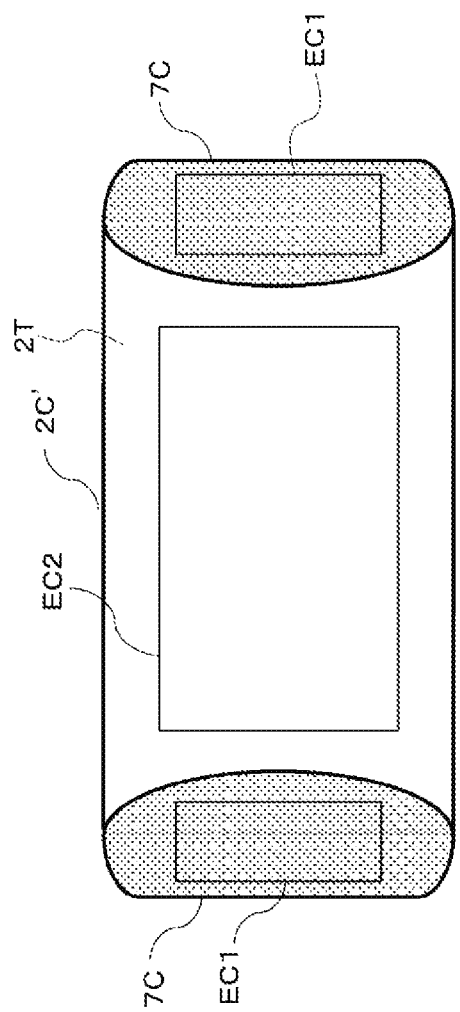

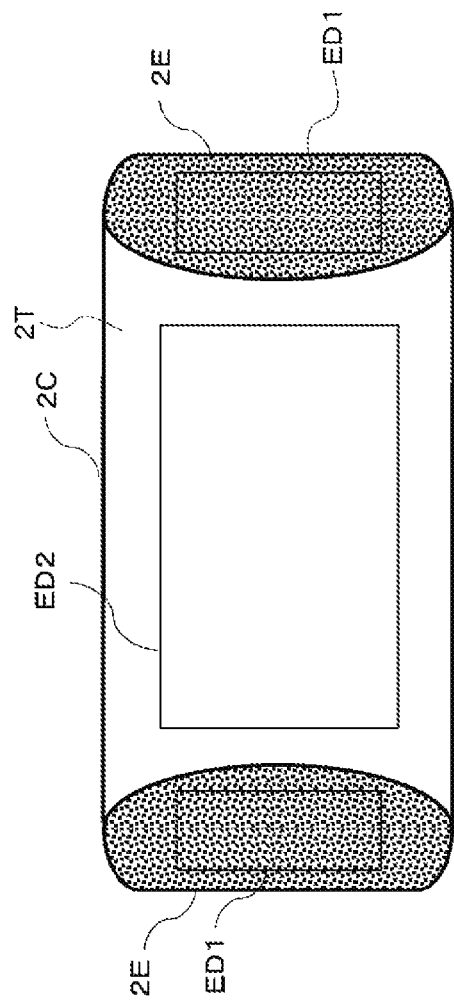

CERAMIC ELECTRONIC COMPONENT WITHOUT EXTERNAL ELECTRODES ON TOP SURFACE, SUBSTRATE ARRANGEMENT INCLUDING THE SAME, AND METHOD OF MANUFACTURING SUCH CERAMIC ELECTRONIC COMPONENT

FIELD OF THE INVENTION

The present invention relates to a ceramic electronic component, a substrate arrangement, and a method of manufacturing the ceramic electronic component.

DESCRIPTION OF THE RELATED ART

As electronic devices become smaller and more sophisticated, a mounting density of electronic components mounted on a mounting board (substrate) is increasing. In order to reduce the electronic components to be mounted on an ordinary mounting surface, on which IC (Integrated Circuit) chips, etc. are mounted, the height of a multilayer ceramic capacitor is reduced and the multilayer ceramic capacitor is mounted on an surface opposite to the ordinary mounting surface of the substrate. This capacitor may be referred to as an LSC (land-side capacitor). This configuration not only reduces the electronic components, including the IC chips, to be mounted on the ordinary mounting surface of the substrate, but also shortens the wiring length to the multilayer ceramic capacitor, which is expected to lower an ESL (equivalent series resistance).

JP-2020-13846A discloses a low-profile (small-height) multilayer ceramic electronic component that has a sufficient anti-folding strength. In JP-2020-13846A, an external electrode of the ceramic electronic component includes a sputtered film, and T1+T2 is 50 μm or less and $T2/(T_1+T_2)$ is 0.32 or less where $T_1$ represents the thickness of the ceramic element body and $T_2$ represents the thickness of the extending portion of the external electrode that reaches the main surface of the ceramic element body.

SUMMARY OF THE INVENTION

A base layer, which serves as a base (underlayer) for a plating layer used for the external electrode of the ceramic electronic component, is sometimes formed by sintering a coating film applied to the element body. If the coating film used to form the base layer is also applied to a top surface of the element body, the height of the ceramic electronic component increases, which hinders the reduction of the height of the multilayer ceramic capacitor.

Therefore, it is an objective of the present invention to provide a ceramic electronic component that has a low profile although the ceramic electronic component includes a base layer for an external electrode formed by sintering a coating film applied to an element body. Another objective of the present invention is to provide a method of manufacturing such ceramic electronic component. Still another objective of the present invention is to provide a substrate arrangement that includes a substrate and the ceramic electronic component mounted on the substrate.

Additional or separate features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, in one aspect, the present disclosure provides a ceramic electronic component that includes an element body and at least one external electrode. The element body includes a dielectric and at least one internal electrode therein. The element body has a plurality of surfaces that includes a first surface and a second surface opposite the first surface. Two end regions are defined on the second surface at opposite ends of the second surface, and an intermediate region is defined on the second surface between the two end regions. The intermediate region has a surface roughness smaller than each of the two end regions. The respective external electrode is formed on the element body at a position away from the second surface. The respective external electrode includes a base layer formed on the element body and a plating layer formed on the base layer. The base layer is connected to the respective internal electrode and contains at least one metal.

The base layer may be formed on a plurality of surfaces the element body except the second surface of the element body.

The base layer may be formed on the element body at a position that does not allow the plating layer to reach the second surface of the element body.

A thickness of the element body may be defined by a distance between the first surface and the second surface, and the thickness of the element body under the intermediate region of the second surface may be smaller than the thickness of the element body under the end regions of the second surface.

The element body may have a third surface that extends perpendicularly from the first surface. A first corner may be defined at a junction between the first surface and the third surface. The base layer may be formed on the first and third surfaces such that the base layer continuously extends from the first surface to the third surface. A thickness of the base layer at the first corner may be smaller than the thickness of the base layer on the first and third surfaces of the element body.

A surface roughness of each of the end regions of the second surface may be between two and five times greater than the surface roughness of the intermediate region of the second surface.

The surface roughness of each of the end regions of the second surface may be between 0.25 μm and 0.8 μm. The surface roughness of the intermediate region of the second surface may be between 0.05 μm and 0.3 μm.

The surface roughness of the intermediate region of the second surface may be greater than a surface roughness of the first surface of the element body.

The surface roughness of the intermediate region of the second surface may be equal to or greater than twice the surface roughness of the first surface of the element body.

The base layer may contain a co-material mixed with the metal(s) in the base layer. A main component of the co-material may be the same as a main component of the dielectric.

The co-material may be an oxide ceramic including the dielectric.

The base layer may be a sintered body of a coating film containing a dielectric material.

The base layer may be formed on the first surface of the element body, and a thickness of the element body from the second surface to the base layer on the first surface may be 150 µm or less.

A thickness of the base layer may be between 3 µm and 6 µm.

The respective internal electrode may include at least one first internal electrode layer and at least one second internal electrode layer. The element body may be a laminate that includes the first internal electrode layer(s) and the second internal electrode layer(s) alternately stacked via dielectric layers. Each of the dielectric layers may contain the dielectric. The respective external electrode may include a first external electrode and a second external electrode. The element body may have two opposite surfaces that are perpendicular to both the first and second surfaces. The first external electrode may be provided on one of the two opposite surfaces and the second external electrode may be provided on the other of the two opposite surfaces. The respective first internal electrode layer may be connected to the first external electrode. The respective second internal electrode layer may be connected to the second external electrode.

The laminate may include cover layers that contain the dielectric and cover the first and second internal electrodes stacked via the dielectric layers. A thickness of each of the cover layers may be between 5 µm and 30 µm.

According to a second aspect of the present invention, there is provided a substrate arrangement that includes a mounting substrate and the ceramic electronic component mounted on the mounting substrate via at least one solder layer. The respective solder layer is wetted up onto the respective external electrode without reaching the second surface of the element body.

The substrate arrangement may further include a resin that encapsulates and seals the ceramic electronic component on the mounting substrate, and at least one solder ball provided on the mounting substrate at a location different from where the ceramic electronic component is mounted.

According to a third aspect of the present invention, there is provided a method of manufacturing a ceramic electronic component. The method includes forming an element body with a dielectric and at least one internal electrode such that the element body has a generally rectangular parallelepiped shape defined by two side surfaces and four other surfaces. The method also includes chamfering edges of the generally rectangular parallelepiped shape of the element body to form curved surfaces on the edges of the element body. The method also includes applying a base material for external electrodes to the two side surfaces of the element body and adjacent areas of the four other surfaces respectively connecting to the two side surfaces through the curved surfaces. The method also includes sintering the base material to form base layers respectively covering the two side surfaces and the adjacent areas of the four other surfaces for the external electrodes. The method also includes removing the base layers from one of the four other surfaces such that a surface roughness of the element body on one of the four other surfaces from which the base layers have been removed becomes greater than a surface roughness of the element body in areas where the base material has not been applied. The method also includes forming a plating layer on each of the base layers.

Removing the base layers from the above-mentioned one of the four other surfaces may be carried out by applying ion impact onto the base layers on the above-mentioned one of the four other surfaces.

According to the present invention, it is possible to form the base layers for the external electrodes by sintering the films (pastes) applied to the element body, while achieving a low profile of the ceramic electronic component (while allowing the ceramic electronic component to have a small height).

It is to be understood that both the foregoing general description and the following detailed description are exemplary and explanatory, and are intended to provide further explanation of the invention as claimed.

BRIEF DESCRIPTION OF THE DRAWINGS

FIG. 2B is an enlarged cross-sectional view of the multilayer ceramic capacitor shown in FIG. 2A.

FIG. 4E is another cross-sectional view useful to describe the manufacturing method for the multilayer ceramic capacitor according to the first embodiment.

FIG. 8B shows a plan view similar to FIG. 8A and is useful to describe the evaluation areas of the surface roughness after the ion milling.

FIG. 9A is a plan view of the same element body as FIG. 8A but shows a pair of second evaluation areas of the surface roughness of the base layers prior to the ion milling together with another evaluation area.

FIG. 9B shows a plan view similar to FIG. 9A and is useful to describe the evaluation areas of the surface roughness after the ion milling.

DESCRIPTION OF THE EMBODIMENTS

Embodiments of the present invention will be described in detail with reference to the accompanying drawings. The following embodiments do not limit the scope of the invention. Not all combinations of features described in the embodiments may be essential to the invention. The embodiments may be modified or changed depending on the specifications of the device to which the invention is applied and various conditions (usage conditions, usage environment, etc.). The technical scope of the present invention is defined by the claims and is not limited by the following individual embodiments. The drawings used conjunction with the following description may differ in scale and shape from the actual structure in order to make each configuration easier to understand.

First Embodiment

Figure 1:
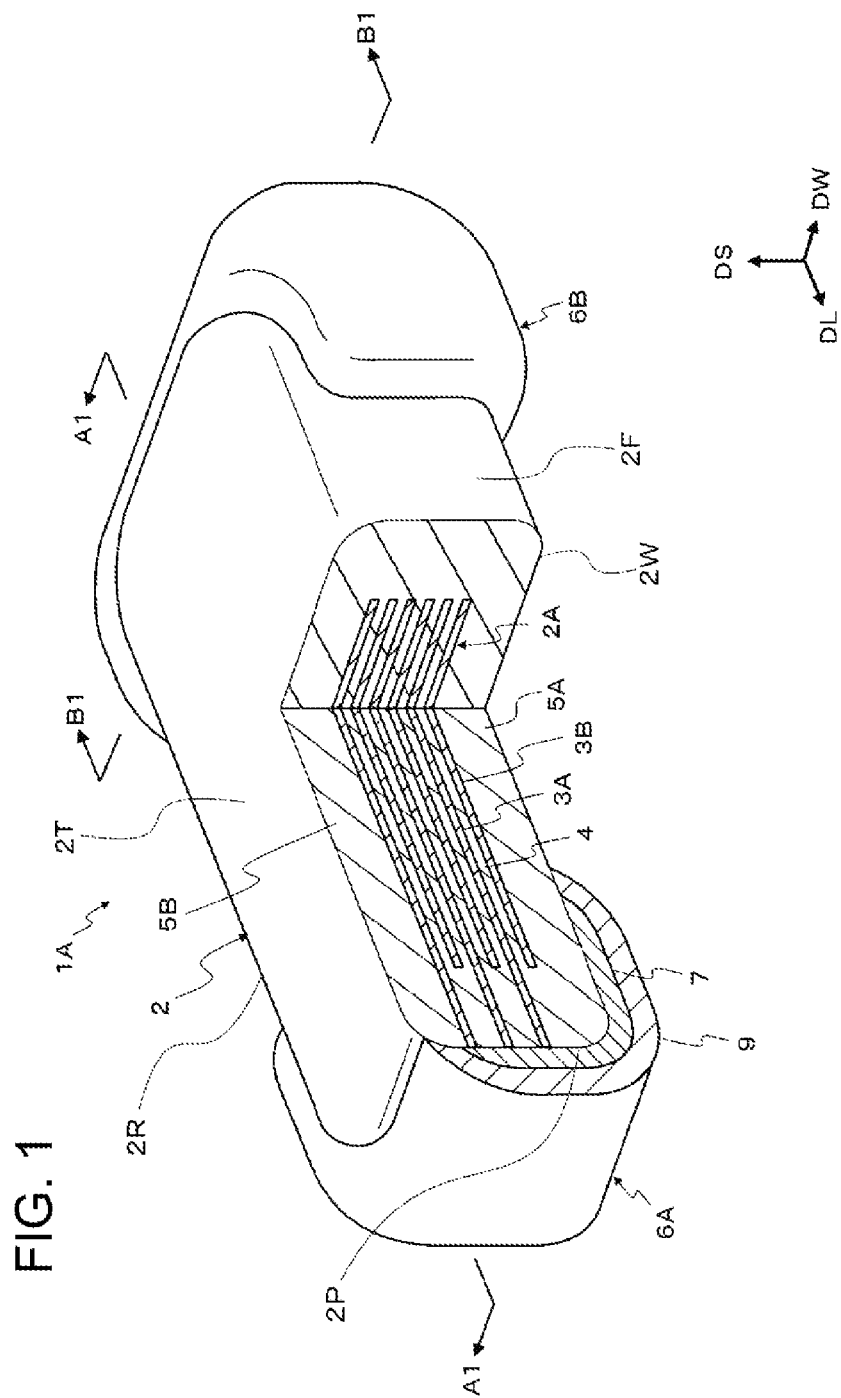
FIG. 1 shows a perspective view of a multilayer ceramic capacitor according to a first embodiment of the invention.
Figure 2A:
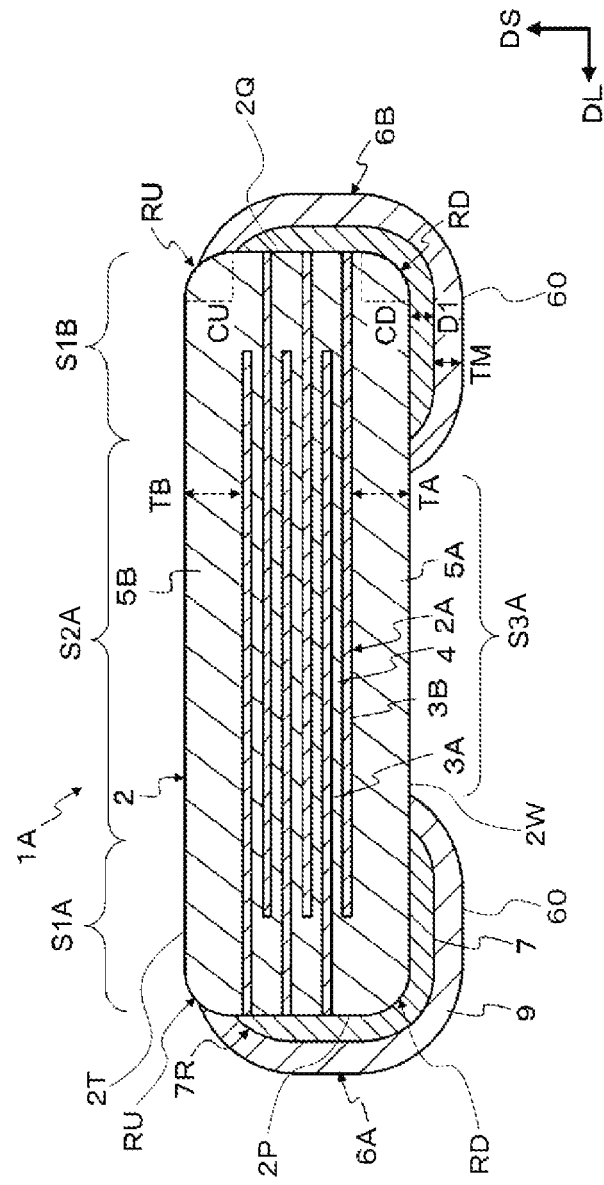
FIG. 2A is a cross-sectional view of the multilayer ceramic capacitor shown in FIG. 1 taken along the line A1-A1 in FIG. 1.
Figure 2C:
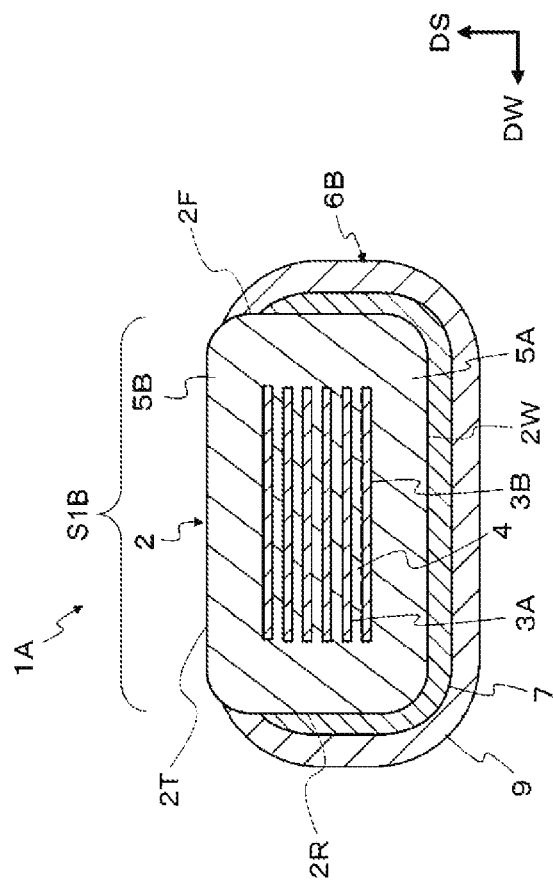
FIG. 2C is a cross-sectional view of the multilayer ceramic capacitor shown in FIG. 1 taken along the line B1-B1 in FIG. 1.

FIG. 1 is a perspective view of a multilayer ceramic capacitor 1A of a first embodiment of the invention. FIG. 2A is a cross-sectional view of the multilayer ceramic capacitor 1A of FIG. 1 cut in the length direction (direction DL) of the multilayer ceramic capacitor 1A. FIG. 2B is an enlarged cross-sectional view of the multilayer ceramic capacitor 1A of FIG. 2A. FIG. 2C is a cross-sectional view of the multilayer ceramic capacitor 1A of FIG. 1 cut in the width direction (direction DW) of the multilayer ceramic capacitor 1A at the position of an external electrode 6B. The multilayer ceramic capacitor 1A is an example of a ceramic electronic component.

As shown in FIG. 1 and FIG. 2A to FIG. 2C, the multilayer ceramic capacitor 1A has an element body 2 and external electrodes 6A and 6B. The element body 2 has a laminate 2A, a lower cover layer 5A and an upper cover layer 5B. The laminate 2A has internal electrode layers 3A, another internal electrode layers 3B and dielectric layers 4.

The lower cover layer 5A is provided below the laminate 2A, and the upper cover layer 5B is provided on the laminate 2A. The internal electrode layers 3A and 3B are alternately stacked via the dielectric layers 4. It should be noted that although FIG. 1 and FIG. 2A to FIG. 2C show a configuration in which the inner electrode layers 3A and 3B are stacked for a total of only six layers, the number of stacked inner electrode layers 3A and 3B is limited to six. The shape of the element body 2 may be a generally rectangular parallelepiped and the shape of the laminate 2A may also be a generally rectangular parallelepiped. In this specification, the longitudinal direction of the element body 2 is designated by DL and may be referred to as the length direction DL. The length direction DL is the right-left direction in FIG. 1. Two opposite surfaces of the element body 2 in the length direction DL are a left side surface 2P and a right side surface 2Q of the element body 2. The width direction of the element body 2 is designated by DW. The element body 2 has a front face 2F and a rear face 2R in the width direction. The height direction of the element body 2 is designated by DS and may be referred to as the stacking direction DS. The top surface of the element body 2 is designated by 2T and the bottom surface of the element body 2 is designated by 2W. The four surfaces of the element body 2 (i.e., the bottom surface (first surface) 2W, the top surface (second surface) 2T, the front surface (fourth surface) 2F, and the rear surface (fifth surface) 2R) are vertically connected to the side surfaces (third surfaces) 2P and 2Q of the element body 2. The first and second surfaces 2W and 2T are opposite to each other, and the fourth and fifth surfaces 2F and 2R are opposite to each other.

The element body 2 is chamfered along the ridges thereof. A curved surface RD (first curved surface) is formed along the chamfered ridge between the bottom surface 2W and the respective side surface 2P, 2Q of the element body 2. A curved surface RU (second curved surface) is formed along the chamfered ridge between the upper surface 2T and the respective side surface 2P, 2Q. The shape of the curved surface RD is different from the shape of the curved surface RU. The radius of curvature CU of the curved surface RU may differ from the radius of curvature CD of the curved surface RD. The radius of curvature CU of the curved surface RU is preferably 10 μm or more. The radii of curvature CD and CU refer to the radii of curvature of the curved surfaces RD and RU at the corners of the cross section of the element body 2 when the element body 2 is cut vertically along the length direction DL.

The external electrodes 6A and 6B are formed on the element body 2 such that the external electrodes 6A and 6B are separated from each other in the length direction DL and situated at opposite ends of the element body 2 in the length direction DL. The external electrodes 6A and 6B are not in contact with the top surface 2T of the element body 2. Thus, each of the external electrodes 6A and 6B is formed at a position lower than the top surface 2T of the element body 2. In other words, each of the external electrodes 6A and 6B is formed at a position away from the top surface 2T of the element body 2. The external electrode 6A is present on a certain area of the bottom surface 2W of the element body 2 and extends over the curved surface RD from the bottom surface 2W and reaches the left side surface 2P. The left side surface 2P is a vertical surface that extends upwards from the bottom surface 2W via the left curved surface RD. The external electrode 6B is present on a certain area of the bottom surface 2W and extends over the curved surface RD from the bottom surface 2W and reaches the right side surface 2Q. The right side surface 2Q is a vertical surface that extends upwards from bottom surface 2W via the right curved surface RD. The external electrodes 6A and 6B extend upward along the side surfaces 2P and 2Q, respectively, but do not reach the top surface 2T of the element body 2. It should be noted that the external electrodes 6A and 6B may also extend over the front surface 2F and/or the rear surface 2R of the element body 2. The upper end of each of the external electrodes 6A and 6B is situated on the respective upper curved surface RU of the element body 2. The lower curved surfaces RD of the element body 2 are covered with the external electrodes 6A and 6B. The thickness of each of the external electrodes 6A and 6B is, for example, between 10 µm and 40 µm.

Because the external electrodes 6A and 6B are formed at the positions lower than the top surface 2T of the element body 2, it is possible to reduce the height of the multilayer ceramic capacitor 1A without reducing the number of internal electrode layers 3A and 3B stacked in the element body 2, and the LSC mounting can be achieved without reducing the capacitance of the multilayer ceramic capacitor 1A.

In the length direction DL of the element body 2, the internal electrode layers 3A and 3B are alternately arranged at different positions in the laminate 2A. Specifically, when compared to the internal electrode layers 3B, the internal electrode layers 3A are arranged on the left side of the element body 2, i.e., the internal electrode layers 3A extend in the length direction DL from the left side surface 2P of the element body toward the right side surface 2Q. The internal electrode layers 3B are arranged on the right side of the element body 2, i.e., the internal electrode layer 3B extend in the length direction DL from the right side surface 2Q toward the left side surface 2P. The left end of each of the internal electrode layers 3A is exposed at the left side surface 2P of the element body 2 and is connected to the external electrode 6A. The right end of each of the internal electrode layers 3B is exposed at the right side surface 2Q of the element body 2 and is connected to the external electrode 6B.

In the width direction DW of the element body 2, the ends of the inner electrode layers 3A and 3B are covered with the dielectric layers 4. In the width direction DW, the ends of the inner electrode layers 3A and 3B may be aligned with each other as shown in FIG. 2C.

The thickness of each of the internal electrode layers 3A and 3B and dielectric layers 4 in the stacking direction DS may be within the range from 0.05 µm to 5 µm, respectively. For example, the thickness of the internal electrode layer 3A is 0.3 µm, the thickness of the internal electrode layer 3B is 0.3 µm, and the thickness of the dielectric layer 4 is 0.3 µm. The material of the inner electrode layers 3A and 3B may be, for example, a metal such as Cu (copper), Ni (nickel), Ti (titanium), Ag (silver), Au (gold), Pt (platinum), Pd (palladium), Ta (tantalum) or W (tungsten), or may be an alloy containing these metals.

The main component of the material of the dielectric layer 4 may be, for example, a ceramic material that has a perovskite structure. The main component may be contained 50 at % or more. The ceramic material of the dielectric layer 4 may be, for example, barium titanate, strontium titanate, calcium titanate, magnesium titanate, strontium barium titanate, calcium barium titanate, calcium zirconate, barium zirconate, calcium zirconate titanate or titanium oxide.

The main component of the material of each of the lower cover layer 5A and the upper cover layer 5B may be, for example, a ceramic material. The main component (i.e., the ceramic material) of each of the lower cover layer 5A and the upper cover layer 5B may be the same as the main component (i.e., the ceramic material) of the dielectric layer 4.

The thickness TA of the lower cover layer 5A is preferably in the range from 5 µm to 30 µm, and the thickness TB of the upper cover layer 5B is preferably in the range from 5 µm to 30 µm. If the thickness TA of the lower cover layer 5A is 5 µm or more and the thickness TB of the upper cover layer 5B is 5 µm or more, it is possible to protect the inner electrode layers 3A and 3B and the dielectric layers 4 from shocks applied during manufacturing of the multilayer ceramic capacitor 1A and mounting of the multilayer ceramic capacitor 1A on a substrate. If the thickness TA of the lower cover layer 5A is 30 µm or less and the thickness TB of the upper cover layer 5B is 30 µm or less, it is possible to reduce the height of the multilayer ceramic capacitor 1A while suppressing (or avoiding) the reduction in the number of stacked internal electrode layers 3A and 3B and dielectric layers 4. Thus, the LSC mounting of the multilayer ceramic capacitor 1A becomes possible while suppressing (or avoiding) the reduction in capacitance of the multilayer ceramic capacitor 1A.

The thickness TA of the lower cover layer 5A may be larger than the radius of curvature CD of the curved surface RD at the lower corner of the element body 2. Similarly, the thickness TB of the upper cover layer 5B may be larger than the radius of curvature CU of the curved surface RU at the upper corner of the element body 2. This configuration can prevent damage to the inner electrode layers 3A and 3B when the upper and lower corners (ridges) of the element body 2 are chamfered to form the curved surfaces RD and RU on the element body 2. Thus, this configuration can prevent delamination between the inner electrode layers 3A and 3B and the dielectric layers 4.

As shown in FIG. 2A, the upper surface 2T of the element body 2 has end regions S1A and S1B and an intermediate region S2A. The end regions S1A and S1B are spaced from each other and located on the opposite ends of the upper surface 2T of the element body 2 in the length direction DL. When viewed in the stacking direction (height direction) DS of the element body 2, the end regions S1A and S1B may be located opposite the base layers (underlayers) 7 on the bottom surface 2W of the element body 2. The end regions S1A and S1B are formed by removing the base layers 7 from the upper surface 2T of the element body 2 (will be described with reference to FIGS. 4H and 4I). It should be noted that FIG. 1 to FIG. 2C show the structure after removing the base layers 7 from the upper surface 2T of the element body 2. The intermediate region S2A is defined between the end regions S1A and S1B on the top surface 2T of the element body 2. The intermediate region S2A is the area where the base layers 7 are not formed on the upper surface 2T of the element body 2 during the manufacturing process of the ceramic electronic component 1A (will be described with reference to FIG. 4A to FIG. 4K). In the following description, the end region S1A may be referred to as a left region S1A, the end region S1B may be referred to as a right region S1B, and the intermediate region S2A may be referred to as a middle region S2A.

The surface roughness of the element body 2 in each of the left region S1A and the right region S1B is greater than the surface roughness of the element body 2 in the middle region S2A. The surface roughness of the element body 2 is evaluated by the arithmetic mean roughness Sa specified in ISO25178 in this disclosure. The surface roughness of the end regions S1A and S1B is preferably between two and five times the surface roughness of the intermediate region S2A. The surface roughness Sa of each of the end regions S1A and S1B is preferably between 0.251 µm and 0.8 µm, and the surface roughness Sa of the intermediate region S2A is preferably between 0.05 μm and 0.3 μm.

The surface roughness of the intermediate region S2A is greater than that of the lower surface region S3A on the lower surface 2W of the element body 2. The lower surface region S3A is the area between the base layers 7 on the lower surface 2W of the element body 2. The middle region S2A is subjected to ion impact when the base layers 7 on the upper surface 2T of the body 2 are removed. The lower surface area S3A is not subjected to the ion impact when the base layers 7 are removed from the upper surface 2T of the element body 2. The surface roughness of the middle region S2A is preferably twice or more than the surface roughness of the lower surface region S3A.

The surface roughness of the end regions S1A, S1B and the middle region S2A may be greater than the surface roughness of the lower surface region S3A. This can improve (enhance) the adhesion between the top surface 2T of the element body 2 and the resin when the multilayer ceramic capacitor 1A is sealed (encapsulated) with the resin. The enhanced adhesion between the top surface 2T and the sealing resin (the encapsulating resin) prevents the formation of gaps that would allow moisture to enter between the top surface of the multilayer ceramic capacitor 1A and the resin. The enhanced adhesion between the top surface 2T and the sealing resin improves the reliability of the resin-sealed multilayer ceramic capacitor 1A.

Referring to FIG. 2B, the thickness T2 of the element body 2 measured at the intermediate region S2A may be smaller than the thickness T1 of the element body 2 measured at the end regions S1A and S1B. The difference between the thickness T1 and the thickness T2 is preferably between 2.2 μm and 5.3 μm. Each of the external electrodes 6A and 6B has a base layer 7 formed on the element body 2 and a plating layer 9 formed on the base layer 7. The base layers 7 are formed on the left side and the right side of the element body 2 so that they are separated from each other in the length direction DL. Specifically, the left base layer 7 is formed in the left area on the bottom surface 2W of the element body 2 and extends over the left curved surface RD and the left side surface 2P of the element body 2. The left base layer 7 does not reach the top surface 2T of the element body 2. Similarly, the right base layer 7 is formed in the right area on the bottom surface 2W of the element body 2 and extends over the right curved surface RD and the right side surface 2Q of the element body 2. The right base layer 7 does not reach the top surface 2T of the element body 2. The position of the upper end of each of the base layers 7 formed on the element body 2 is decided such that the plating layer 9 covering the base layer 7 does not protrude from the upper surface 2T of the element body 2. For example, the upper end of the left base layer 7 on the left side surface 2P of the element body 2 may be lower than the top surface 2T of the element body 2 by an amount equal to or greater than the thickness TM of the plating layer 9. A curved surface 7R is formed at the upper end portion of the left base layer 7 on the left side surface 2P of the element body 2. The right base layer 7 has the same configuration as the left base layer 7. It should be noted that each of the base layers 7 may also extend to the front surface 2F and/or the rear surface 2R of the element body 2 from the bottom surface 2W.

The thickness D1 of the base layer 7 is preferably between 3 μm and 6 μm. When the thickness D1 of the base layer 7 is 3 μm or more, it is possible to form the base layer 7 that continuously extends from the bottom surface 2W to the side surface 2P, 2Q of the element body 2 while the base layer 7 is closely contacting the curved surface RD of the element body 2. By setting the thickness D1 of the base layer 7 to 6 μm or less, it is possible to improve the efficiency of removing the base layer 7 from the upper surface 2T of the element body 2.

The main component of the metal used as the conductive material of the base layer 7 may contain at least one of, for example, Cu, Fe (iron), Zn (zinc), Al (aluminum), Ni, Pt, Pd, Ag, Au and Sn (tin) or may contain an alloy that includes at least one of these metals. The base layer 7 may include a co-material which is mixed with the metal(s) of the base layer. The co-material may be present in the form of a plurality of islands in the base layer 7. If the co-material is present in the base layer 7 in the form of the islands, the co-material can reduce the difference in the thermal expansion coefficient between the element body 2 and the base layer 7, and can alleviate the stress on the base layer 7. The co-material is, for example, the ceramic component, which is the main component of the dielectric layer 4. The base layer 7 may contain a glass component. If the glass component is mixed in the base layer 7, the glass component can densify the base layer 7. This glass component is, for example, an oxide of Ba (barium), Sr (strontium), Ca (calcium), Zn, Al, Si (silicon) or B (boron).

The base layer 7 may contain a metal component that is included in the element body 2. This metal component is, for example, Mg, and a trace amount of Ni, Cr, Sr, Al, Na and/or Fe may be included in this metal component. The base layer 7 may include, for example, a compound containing Mg, Ni and O as a compound of the metal used as the conductive material of the base layer 7, the metal contained in the element body 2 and oxygen.

The base layer 7 is preferably composed of a sintered body of a coating film containing a dielectric material. This makes it possible to make the base layer 7 thicker while ensuring adhesion between the element body 2 and the base layer 7, and to ensure conductivity with the internal electrode layers 3A and 3B while ensuring the strength of the external electrodes 6A and 6B.

The plating layer 9 is formed for each of the external electrodes 6A and 6B such that the plating layer covers the associated base layer 7. The plating layer 9 is not formed on the top surface 2T of the element body 2. The upper end of the plating layer 9 may be situated on the curved surface RU of the element body 2. The lower part, including the lower end, of the plating layer 9 may be situated on the bottom surface 2W of the element body 2.

The main component of the material of the plating layer 9 may be a metal such as Cu, Ni, Al, Zn or Sn, or an alloy made from two or more of these metals. The plating layer 9 may have a single-layer structure that includes a single metal component or a multi-layer structure that includes a plurality of plating layers of different metal components. For example, the plating layer 9 has a three-layer structure consisting of a Cu plating layer formed on the base layer 7, a Ni plating layer formed on the Cu plating layer, and a Sn plating layer formed on the Ni plating layer. The Cu plating layer can enhance the adhesiveness of the plating layer 9 to the base layer 7. The Ni plating layer can increase the thermal resistance of the external electrode 6A, 6B during soldering. The Sn plating layer can improve the wettability of the solder to the plating layer 9.

The left plating layer 9 conducts with the internal electrode layers 3A via the left base layer 7. The right plating layer 9 conducts with the internal electrode layers 3B via the right base layer 7. The two plating layers 9 also conduct with the terminals of the mounting substrate via soldering. In order to ensure the strength of each of the external electrodes 6A and 6B, and also ensure the proper conduction between the base layers 7 and the plating layers 9 and the proper conduction between the terminals of the mounting substrate and the plating layers 9, the thickness TM of each of the plating layers 9 is preferably equal to or greater than 10 μm. In order to prevent each of the plating layers 9 from protruding upward from the upper surface 2T of the element body 2, the thickness TM of the plating layer 9 preferably satisfies the relation of CU-TM being greater than zero (CU-TM>0).

For example, the size of the multilayer ceramic capacitor 1A may satisfy the relation of length>width>height, or the relation of length>width=height. In order to reduce the height of the multilayer ceramic capacitor 1A, the height of the multilayer ceramic capacitor 1A is preferably 150 μm or less. The height of the multilayer ceramic capacitor 1A is the thickness of the multilayer ceramic capacitor 1A from the bottom surface 60 of the external electrode 6A (6B) to the top surface 2T of the element body 2.

Figure 6:
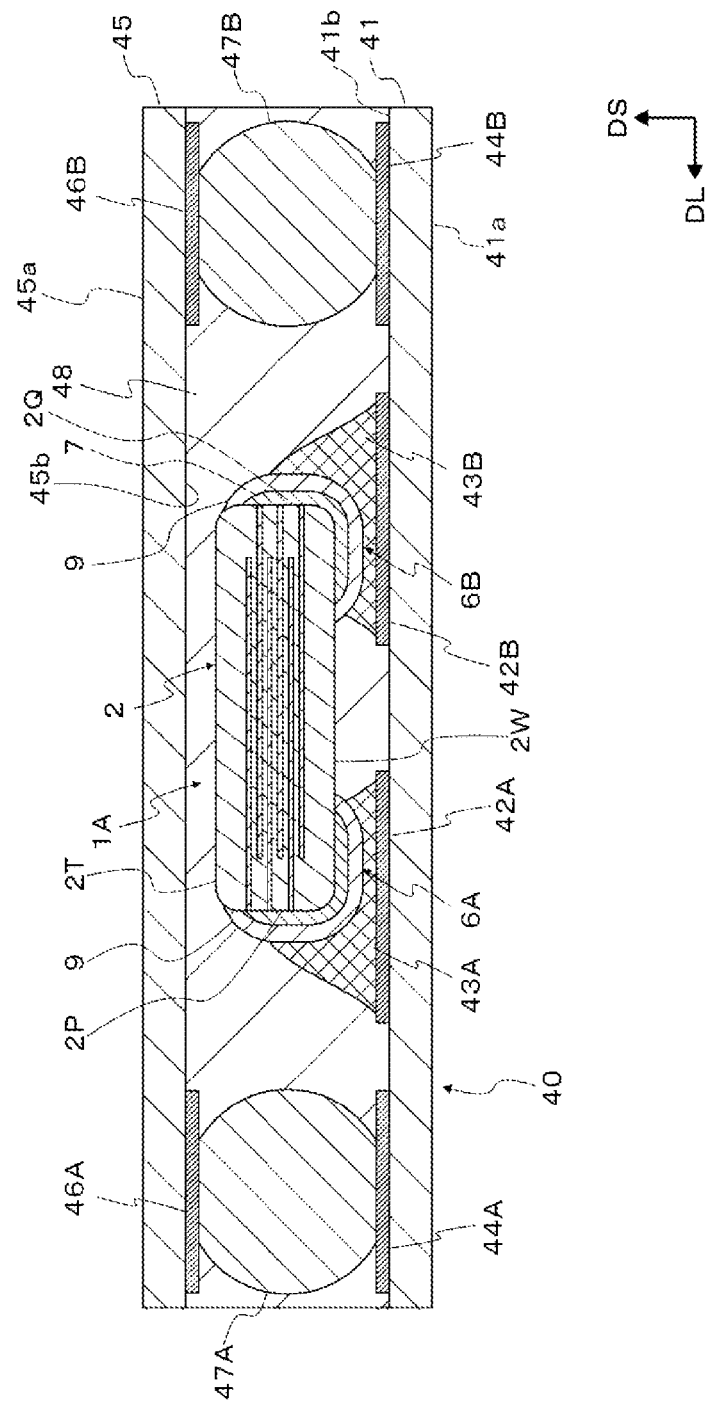
FIG. 6 shows a cross-sectional view of a substrate arrangement that includes a multilayer ceramic capacitor and two mounting substrates according to a third embodiment.

If the height of the multilayer ceramic capacitor 1A is equal to or smaller than 150 μm, the height of the multilayer ceramic capacitor 1A can be made smaller than the diameter of a solder ball 47A, 47B (FIG. 6). The solder balls are used to mount a mounting substrate 41 (FIG. 6) of the multilayer ceramic capacitor 1A on a motherboard 45 (FIG. 6). The multilayer ceramic capacitor 1A is placed on a predetermined face of the mounting substrate, and the solder balls are provided on the same face of the mounting substrate. As a result, it is possible to mount the mounting substrate of the multilayer ceramic capacitor 1A onto the motherboard with the solder balls while mounting the multilayer ceramic capacitor 1A on the predetermined face of the mounting substrate which has the solder balls thereon. Thus, the multilayer ceramic capacitor 1A may be placed on the predetermined face (e.g., a rear face) of the mounting substrate and one or more semiconductor chips may be placed on the opposite face (e.g., a front face) of the mounting substrate. Therefore, the multilayer ceramic capacitor 1A can be mounted in close proximity to the semiconductor chip(s). Also, the mounting substrate can have a large mounting area for the semiconductor chip(s) on the front face thereof. This makes it possible to increase the mounting density of the semiconductor chips while effectively eliminating the noise added to the semiconductor chips.

It should be noted that although the left base layer 7 reaches the topmost inner electrode layer 3A in FIG. 1 and FIGS. 2A-2C, the left base layer 7 may not reach the topmost inner electrode layer 3A and only the plating layer 9 may reach and cover the topmost inner electrode layer 3A.

Figure 3:
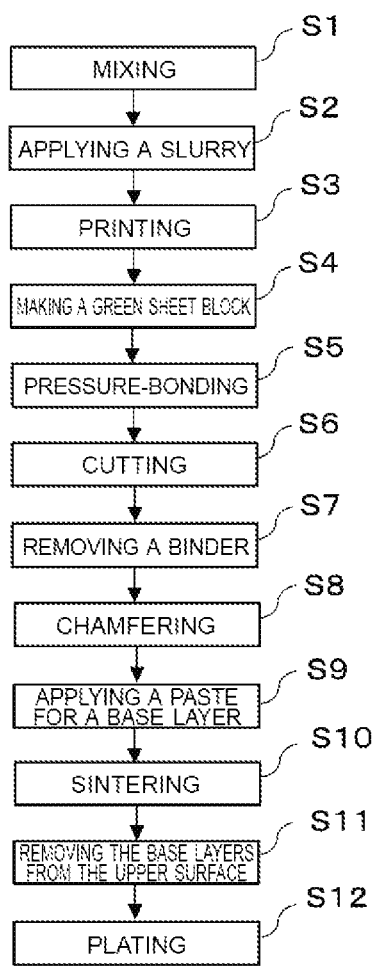
FIG. 3 shows a flowchart of a method of manufacturing the multilayer ceramic capacitor shown in FIG. 1.

FIG. 3 is a flowchart showing a method of manufacturing the multilayer ceramic capacitor 1A according to the first embodiment. FIG. 4A to FIG. 4K are a series of cross-sectional views showing the method of manufacturing the multilayer ceramic capacitor 1A. It should be noted that for the sake of description and understanding, the three inner electrode layers 3A and the three inner electrode layers 3B are alternately stacked in the thickness direction DS of the capacitor 1A, with the dielectric layers 4 being interposed between the inner electrode layers 3A and 3B.

In Step S1 of FIG. 3, an organic binder and an organic solvent as a dispersant and a forming aid are added to a dielectric material powder, and pulverized and mixed to produce a muddy slurry. The dielectric material powder includes, for example, a ceramic powder. The dielectric material powder may contain an additive or additives. The additive(s) may be, for example, an oxide of Mg, Mn, V, Cr, Y, Sm, Eu, Gd, Tb, Dy, Ho, Er, Tm, Yb, Co, Ni, Li, B, Na, K or Si, or glass. The organic binder is, for example, polyvinyl butyral resin or polyvinyl acetal resin. The organic solvent is, for example, ethanol or toluene.

Figure 4A:
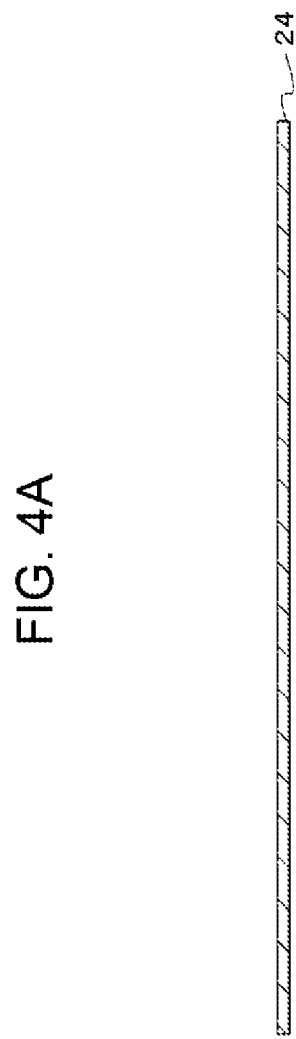
FIG. 4A shows a cross-sectional view useful to describe the manufacturing method for the multilayer ceramic capacitor according to the first embodiment.

Next, as indicated in Step S2 of FIG. 3 and shown in FIG. 4A, a green sheet 24 is prepared. Specifically, the slurry containing the ceramic powder is applied onto a carrier film in a sheet form and dried to manufacture the green sheet 24. The carrier film is, for example, a PET (polyethylene terephthalate) film. A doctor blade method, a die coater method or a gravure coater method may be used to apply the slurry onto the carrier film. Step S2 is repeated to prepare a plurality of green sheets 24.

Figure 4B:
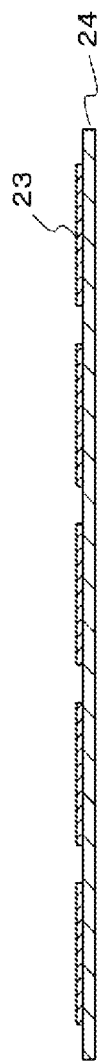
FIG. 4B is another cross-sectional view useful to describe the manufacturing method for the multilayer ceramic capacitor according to the first embodiment.

Next, as indicated in Step S3 of FIG. 3 and shown in FIG. 4B, a conductive paste, which will become the internal electrode, is applied in a predetermined pattern onto each of those green sheets 24, which will form the internal electrode layers 3A and 3B, among the green sheets prepared in Step S1 to form a plurality of internal electrode patterns 23 on that green sheet 24. In Step 3, it is possible to form a plurality of internal electrode patterns 23 on the single green sheet 24 such that the internal electrode patterns 23 are separated from each other in the longitudinal direction of the green sheet 24. The conductive paste for the internal electrode includes a powder of the metal used as the material of the internal electrode layers 3A and 3B. For example, if the metal used as the material of the internal electrode layers 3A and 3B is Ni, the conductive paste for the internal electrodes contains a Ni powder. Further, the conductive paste for the internal electrodes includes a binder, a solvent, and, if necessary, an auxiliary agent. The conductive paste for the internal electrodes may contain, as a co-material, a ceramic material which is the main component of the dielectric layers 4. The application of the conductive paste for the internal electrodes may be carried out by a screen printing method, an ink jet printing method or a gravure printing method. Thus, Step S3 may be referred to as a printing step. In this manner, a plurality of green sheets 24 that have the inner electrode patterns 23 thereon are prepared.

Figure 4C:
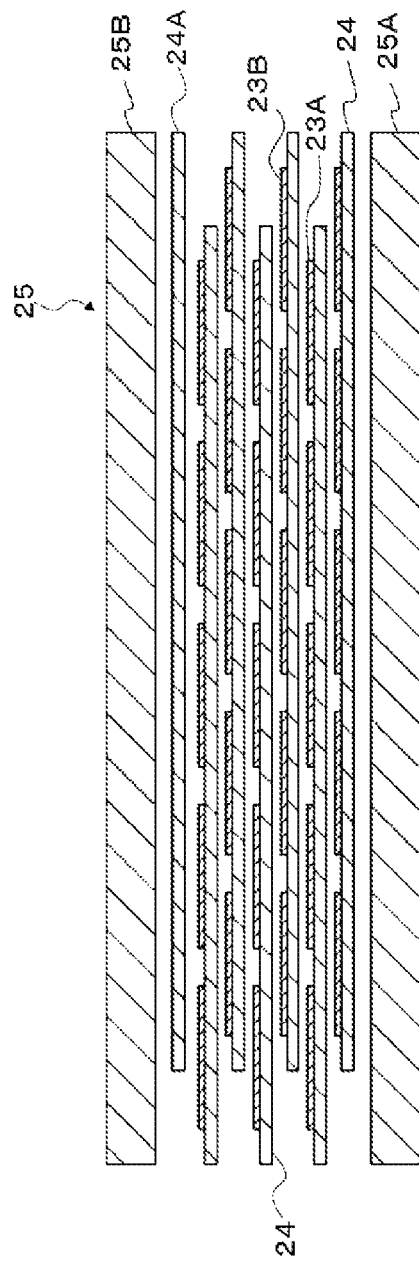
FIG. 4C is still another cross-sectional view useful to describe the manufacturing method for the multilayer ceramic capacitor according to the first embodiment.

Next, as indicated in Step S4 of FIG. 3 and shown in FIG. 4C, the green sheets 24 on which the internal electrode patterns 23 are formed and the green sheets 24A, 25A and 25B on which the internal electrode patterns 23 are not formed are laminated in a predetermined order to create a block 25 of the green sheets 24. The green sheets 25A and 25B on which the internal electrode patterns 23 are not formed are used as outer layers (i.e., the bottom layer and the top layer). The thickness of the green sheet 25A, 25B is greater than the thickness of the green sheet 24 on which the internal electrode patterns 23 are formed. In Step S4, the green sheets 24 having the internal electrode patterns 23 thereon are divided into two groups, i.e., the green sheets 24 having the internal electrode patterns 23A thereon and the green sheets 24 having the internal electrode patterns 23B thereon. Then, the green sheets 24 having the internal electrode patterns 23A thereon and the green sheets 24 having the internal electrode patterns 23B thereon are stacked alternately in the laminating direction such that the internal electrode patterns 23A on the green sheet 24 and the internal electrode patterns 23B on the next or adjacent green sheet 24 are alternately shifted in the longitudinal direction of the green sheet 24. Further, three types of portions are defined in the green sheet block 25. Specifically, a portion where only the internal electrode patterns 23A are stacked in the stacking direction, a portion where the internal electrode patterns 23A and 23B are stacked alternately in the stacking direction, and a portion where only the internal electrode patterns 23B are stacked in the stacking direction are defined in the green sheet block 25.

Figure 4D:
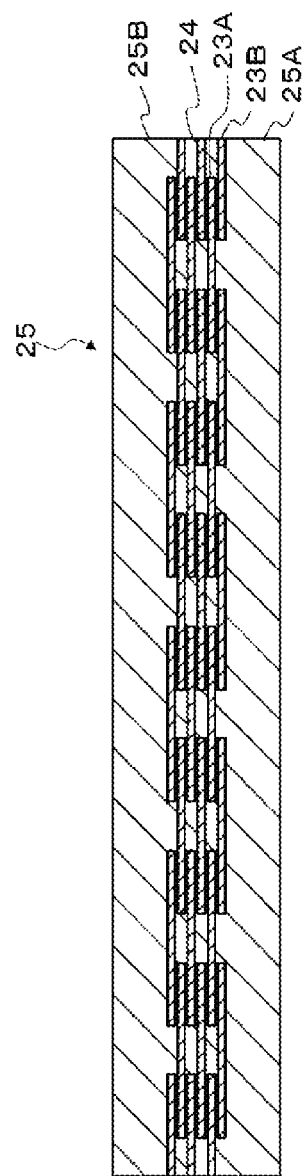
FIG. 4D is yet another cross-sectional view useful to describe the manufacturing method for the multilayer ceramic capacitor according to the first embodiment.

Next, as indicated in Step S5 of FIG. 3 and shown in FIG. 4D, the laminate block 25 obtained in the forming process of Step S4 of FIG. 3 is pressed such that the green sheets 24, 24A, 25A and 25B are pressure-bonded. Pressing the laminate block 25 may be carried out by, for example, sandwiching the laminate block 25 between resin films, and hydrostatically pressing the laminate block 25.

Next, as indicated in Step S6 of FIG. 3 and shown in FIG. 4E, the pressed laminate block 25 is cut such that the block 25 is separated to a plurality of element bodies, each of which has a rectangular parallelepiped shape. Each element body has six surfaces. The cutting of the laminate block 25 is carried out at the portions where only the inner electrode patterns 23A are present in the stacking direction, and the portions where only the inner electrode patterns 23B are present in the stacking direction, as indicated by a plurality of vertical broken lines 27. The cutting of the laminate block 25 is carried out by, for example, blade dicing or a similar method. One of the resulting element bodies 2" is shown in FIG. 4F.

Figure 4F:
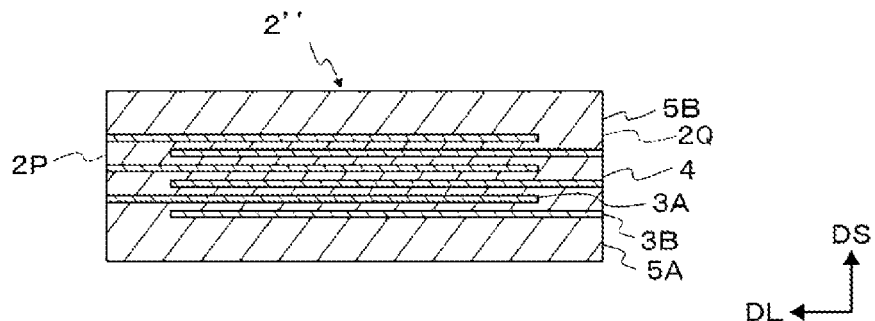
FIG. 4F shows another cross-sectional view useful to describe the manufacturing method for the multilayer ceramic capacitor according to the first embodiment.

As shown in FIG. 4F, the internal electrode layers 3A and 3B are alternately laminated via the dielectric layers 4 in each of the individual element bodies 2", with the upper cover layer 5A becoming the top layer and the lower cover layer 5B becoming the bottom layer. The internal electrode layers 3A are exposed on the left face 2P of each element body 2", and the internal electrode layers 3B are exposed on the right face 2Q of each element body 2". It should be noted that in FIG. 4F the element body 2" is shown enlarged in the length direction DL.

Next, as indicated in Step S7 of FIG. 3, the binder contained in each of the element bodies 2" obtained in Step S6 of FIG. 3 is removed. The removal of the binder is carried out by, for example, heating the element bodies 2" in an N2 atmosphere at about 350 degrees C.

Figure 4G:
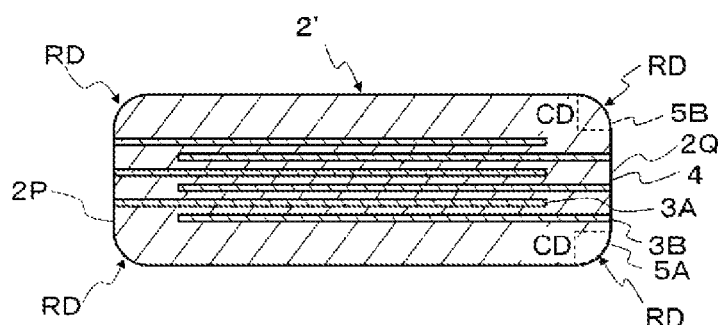
FIG. 4G shows another cross-sectional view useful to describe the manufacturing method for the multilayer ceramic capacitor according to the first embodiment.

Next, as indicated in Step S8 of FIG. 3 and shown in FIG. 4G, chamfering is performed on each of the element bodies 2" along the four edges (ridges) that extend in the width direction DW of the element body 2" to prepare a plurality of element bodies 2' such that each element body 2' has four curved surfaces RD at upper and lower edges of the element body 2' in the width direction DW. Barrel polishing may be used to chamfer each of the element bodies 2". The radii of curvature CD of the four curved surfaces RD at the upper and lower edges of the element body 2' are equal to each other. Chamfering may also be performed on along other edges of the element body that extend in the length direction DL and the height direction DS of the element body.

Next, as indicated in Step S9 of FIG. 3, a conductive paste for the base layer (underlayer) 7 is applied to the two side surfaces 2P and 2Q of each element body 2' which has undergone the chamfering in Step S8 of FIG. 3 and to the end areas of the remaining four surfaces (top surface 2T, the bottom surface 2W, the front surface 2F and the rear surface 2R) of the element body 2' which are in contact with the respective side surfaces 2P and 2Q. Then, the conductive paste is dried. A dipping method may be used to apply the conductive paste for the base layer 7. The conductive paste for the base layer 7 includes a powder or filler of the metal used as the conductive material of the base layer 7. For example, when the metal used as the conductive material of the base layer 7 is Ni, the conductive paste for the base layer includes a powder or filler of Ni. Further, the conductive paste for the base layer includes, as a co-material, a ceramic component, which is the main component of the dielectric layers 4, for example. Particles of oxide ceramics mainly composed of barium titanate (0.8 μm to 4 μm in D50 particle diameter), for example, are mixed in the conductive paste for the base layer, as the co-material. Further, the conductive paste for the base layer includes a binder and a solvent. The thickness of the conductive paste for the base layer applied to the element body 2' may be uniform except for the ends of the conductive paste. In order to allow the multilayer ceramic capacitor 1A to have large electrode areas so that close contact between the conductive material (e.g., solder) and each of the electrodes 6A and 6B is ensured upon attaching the electrodes 6A and 6B of the multilayer ceramic capacitor 1A onto a mounting substrate with the solder, a secondary conductive film may additionally be formed on the conductive paste for the base layer. The secondary conductive film may be formed by sputtering or other suitable methods. The material of the secondary conductive film is, for example, Cu or Ni. A combination of the conductive paste and the secondary conductive film will become the base layer.

Figure 4H:
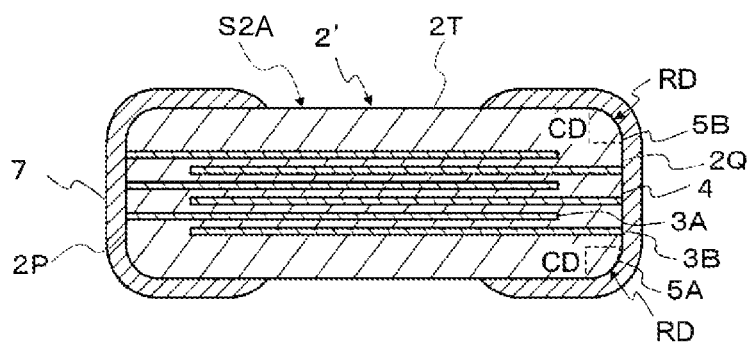
FIG. 4H is another cross-sectional view useful to describe the manufacturing method for the multilayer ceramic capacitor according to the first embodiment.

Next, as indicated in Step S10 of FIG. 3 and shown in FIG. 4H, the element bodies 2', on which the conductive paste for the base layer is applied in Step S9 of FIG. 3, undergo the sintering process such that the inner electrode layers 3A and 3B are integrated with the dielectric layers 4 in each element body 2' and the base layers 7 are formed and integrated with the element body 2'. The sintering of the element bodies 2' and the conductive paste for the base layers is carried out in, for example, a sintering furnace in a temperature range from 1000 degrees C. to 1400 degrees C. for ten minutes to two hours. If a base metal such as Ni or Cu is used as the material of the interna electrode layers 3A and 3B, the sintering process may be carried out in the sintering furnace while the interior of the sintering furnace is kept to a reducing atmosphere in order to prevent the oxidation of the internal electrode layers 3A and 3B.

Figure 4I:
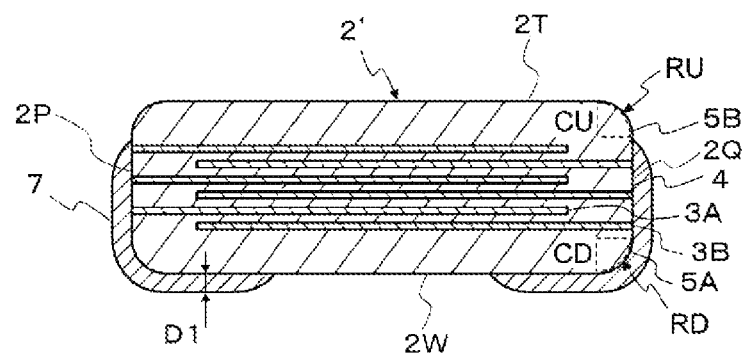
FIG. 4I is another cross-sectional view useful to describe the manufacturing method for the multilayer ceramic capacitor according to the first embodiment.

Next, as indicated in Step S11 of FIG. 3 and shown in FIG. 4I, ion milling is applied to the base layers 7 on the upper surface 2T of the element body 2' such that the ion impact caused by the ion milling removes the base layers 7 from the upper surface 2T of the element body 2', and also removes the base layers 7 from the upper curved surfaces RD at the upper edges of the element body 2'. As a result, the upper end of each of the base layers 7 may become lower than the top surface 2T of the element body 2' by an amount equal to or greater than the radius of curvature CD of the curved surface RD of the element body 2'. For example, the upper end of each of the base layers 7 may become lower than the top surface 2T of the element body 2' by an amount equal to the radius of curvature CD of the curved surface RD of the body 2' by adjusting the ion milling time needed to remove the base layers 7 from the upper surface 2T of the element body 2'. During this ion milling, the ion impact is also applied to the upper curved surfaces RD of the element body 2' such that the shape of each of the upper curved surfaces RD of the element body 2' changes to a curved surface RU. The curved surface RU has a radius of curvature CU.

At the time of the ion milling, the upper curved surfaces RD exist at the upper edges of the element body 2', which are adjacent to the upper surface 2T of the element body 2'. Thus, when the ion impact is applied to the base layers 7 on the upper surface 2T of the element body 2', the ion impact is also effectively applied to the base layers 7 on the upper curved surfaces RD, and the position of the upper end of each of the base layers 7 can be efficiently lowered.

The method of applying the ion impact to the base layers 7 is not limited to the ion milling. For example, anisotropic dry etching may be performed to apply the ion impact to the base layers 7. To prevent the ion impact from being applied to the area between the two base layers 7 on the upper surface 2T of the element body 2' (i.e., the intermediate region S2A in FIG. 2A or FIG. 4H), the intermediate region S2A may be covered with a mask and then the ion impact may be applied to the base layers 7 on the upper surface 2T of the element body 2'. This mask may be a hard mask installed above the intermediate region S2A between the base layers 7 on the upper surface 2T of the element body 2', or it may be a resist film applied on the intermediate region S2A of the upper surface 2T. The removal of the base layers 7 from the upper surface 2T of the element body 2' may be carried out after the sintering of the element body 2' to which the conductive paste for the base layers has been applied. Alternatively, the removal of the base layers 7 from the upper surface 2T of the element body 2' may be carried out before the sintering of the element body 2' to which the conductive paste for the base layers has been applied.

Figure 4J:
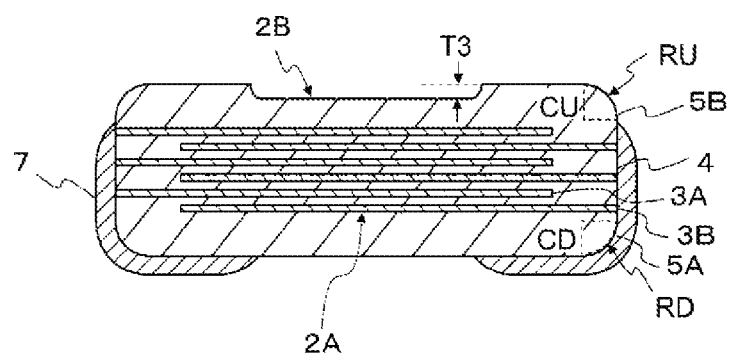
FIG. 4J shows a cross-sectional view useful to describe a modified process in the manufacturing method for the multilayer ceramic capacitor.
Figure 4K:
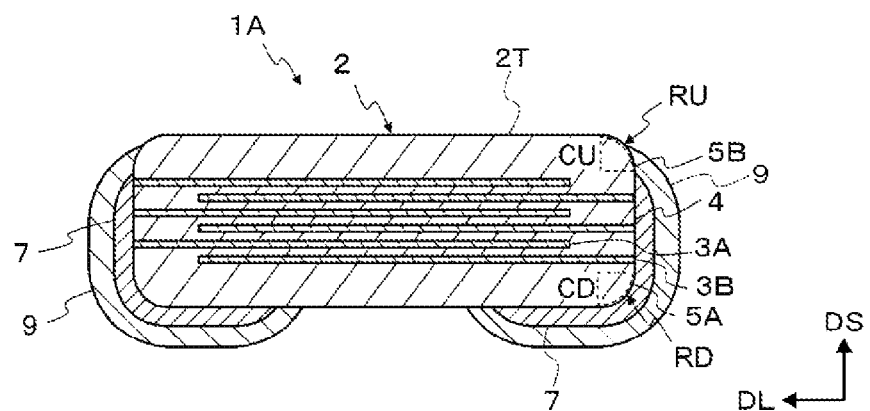
FIG. 4K is a cross-sectional view useful to describe the manufacturing method for the multilayer ceramic capacitor according to the first embodiment.

It should be noted that the thickness of the element body 2' may be slightly reduced in the intermediate region S2A, as shown in FIG. 4J, when removing the base layers 7 from the upper surface 2T of the element body 2'. For example, the thickness of the element body 2' in the intermediate region S2A may be reduced by an amount T3. The resulting element body is designated by 2B in FIG. 4J. When barium titanate is used for the dielectric layers 4 and a combination of Ni and a co-material is used for the base layers 7, the removed thickness T3 may be about 1/1.12×D1 if the base layers 7 on the upper surface 2T are removed before the sintering and may be 1/1.32×D1 if the base layers 7 on the upper surface 2T are removed after the sintering. Therefore, removing the base layers 7 after the sintering has a smaller effect on the strength of the multilayer ceramic capacitor 1A because the amount of shaving (i.e., the reduced thickness T3) of the element body 2' is smaller when the base layer removal is carried out after the sintering than when the base layer removal is carried out before the sintering. If the thickness D1 of the base layer 7 is between 3 μm and 6 μm, the reduced thickness T3 is between 2.2 μm and 5.3 μm. The smaller the reduced thickness T3, the thicker the laminate 2A (i.e., the thicker a combination of the internal electrode layers 3A and 3B and the dielectric layers 4). In other words, as the reduced thickness T3 is smaller, the adverse effect on the strength of the multilayer ceramic capacitor 1A becomes smaller.

Subsequent to Step S11 (FIG. 4I), a plating process is carried out. Specifically, as indicated in Step S12 of FIG. 3 and shown in FIG. 4K, a plating layer 9 is formed on each of the base layers 7. In the process of forming the plating layer 9, for example, Cu plating, Ni plating and Sn plating may be sequentially performed. In this process, the element body 2' on which the base layers 7 are formed is placed in a barrel together with the plating solution, and the electricity is supplied to the barrel while rotating the barrel, so as to form the plating layers 9. The plating layers 9 cover the base layers 7, respectively, without protruding from the upper surface 2T of the element body 2 in the height direction DS of the element body 2.

Second Embodiment

Figure 5A:
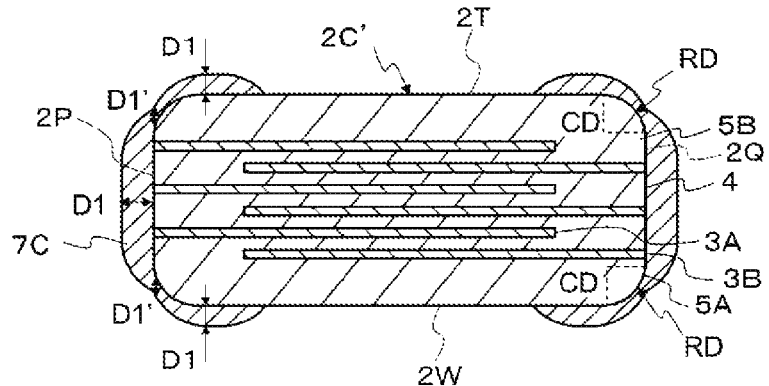
FIG. 5A is a cross-sectional view useful to describe a method of manufacturing a multilayer ceramic capacitor according to the second embodiment of the invention.
Figure 5B:
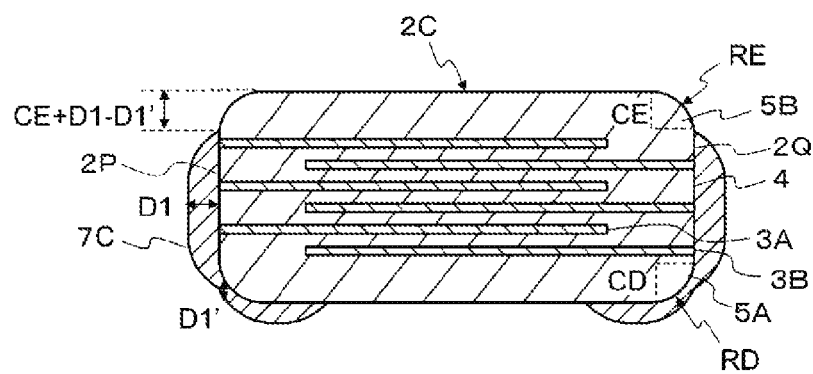
FIG. 5B is another cross-sectional view useful to describe the method of manufacturing the multilayer ceramic capacitor according to the second embodiment.
Figure 5C:
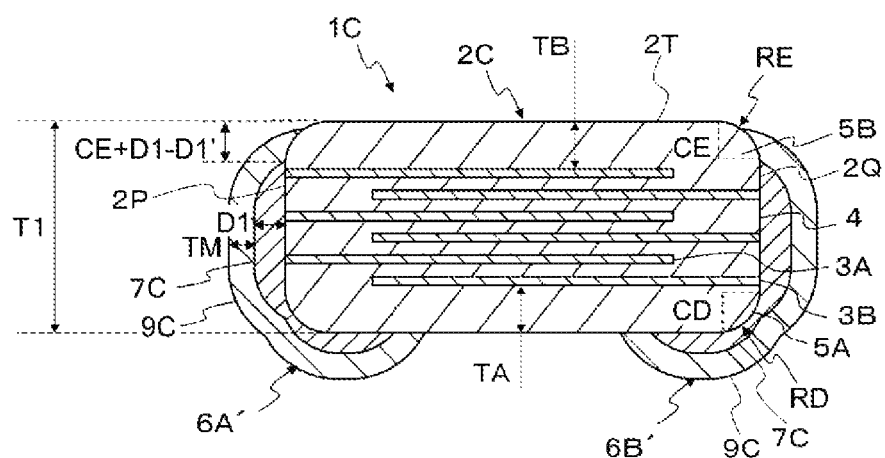
FIG. 5C is a cross-sectional view of the multilayer ceramic capacitor according to the second embodiment.

A second embodiment of the invention will be described with reference to FIG. 3 and FIG. 5A to FIG. 5C. FIG. 5A to FIG. 5C are a series of cross-sectional views showing certain steps in a method of manufacturing a multilayer ceramic capacitor 1C according to the second embodiment. The method of manufacturing the multilayer ceramic capacitor 1C according to the second embodiment basically includes the same processes as Step S1 to Step S12 shown in FIG. 3 although Step S9 to Step 12 of the second embodiment are slightly different from Step S9 to Step 12 of the first embodiment. FIG. 5A shows a process of applying the conductive paste for the base layers onto an element body 2C'. FIG. 5B shows a process of removing the base layers from predetermined portions of the element body 2C'. FIG. 5C shows the resulting multilayer ceramic capacitor 1C. The multilayer ceramic capacitor 1C has an element body 2C. The thickness of the element body 2C of the second embodiment shown in FIG. 5C is smaller than the thickness of the element body 2 of the first embodiment shown in FIG. 4K. The thickness of the element body 2C in FIG. 5C may be equal to or smaller than 50 μm.

In Step S9 of the second embodiment, the conductive paste for the base layers is applied onto the two side surfaces 2P and 2Q of the element body 2C' and also applied onto predetermined areas of the remaining four surfaces (top surface 2T, the bottom surface 2W, the front surface 2F and the rear surface 2R) adjacent to the side surfaces 2P and 2Q of the element body 2C', as shown in FIG. 5A. The conductive paste for the base layers follows the shape of the flat surfaces of the element body 2C' due to its surface tension, but it does not follow the shape of the curved surfaces RD of the element body 2C'. Therefore, the thickness of the conductive paste is thin at the curved surfaces RD.

Next, in Step S10 of the second embodiment, the element body 2C' to which the conductive paste for the base layers has been applied in Step S9 is sintered to unify the internal electrode layers 3A and 3B and the dielectric layers 4, and to form the base layers 7C integrated with the element body 2C'. Because the shape of the conductive paste applied in Step S9 generally remains after the sintering, the thickness D1' of the base layer 7C on each of the curved surfaces RD of the element body 2C' is smaller than the thickness D1 of the base layer 7C on each of the flat surfaces of the element body 2C'.

Next, the ion milling is applied to the base layers 7C on the top surface 2T of the element body 2C' in Step S11 of the second embodiment. As shown in FIG. 5B, the ion impact caused by the ion milling removes the base layers 7C from the upper surface 2T of the element body 2C' and from the upper curved surfaces RD of the element body 2C'. The upper end of each of the base layers 7C on the side surfaces 2P and 2Q of the element body 2C' may be lower than the top surface 2T of the element body 2C' by an amount equal to or greater than the radius of curvature CD of the curved surface RD of the element body 2C'.

During Step S11, the ion impact is also applied to the upper curved surfaces RD of the element body 2C'. As a result, the shape of each of the upper curved surfaces RD changes to a shape RE, as shown in FIG. 5B. The element body having such upper surfaces RE is designated at 2C in FIG. 5B. The shape of the curved surface RE of the element body 2C differs from the shape of the curved surface RD at the bottom corner of the element body 2C. The radius of curvature CE of the curved surface RE may be different from the radius of curvature CD of the curved surface RD. The upper end of each of the base layers 7C on the side surfaces 2P and 2Q of the element body 2C may be lower than the upper surface 2T of the element body 2C by an amount of CE+D1−D1'. The curved surface RE of the element body 2C may have an inflection point. The inflection point of the curved surface RE may be at a location where the thickness of the base layer 7C is D1' as shown in FIG. 5A.

Because the thickness D1' of the base layer 7C on each of the curved surfaces RD of the element body 2C' is smaller than the thickness D1 of the base layer 7C on each of the flat surfaces (e.g., the top surface 2T) of the element body 2C', the base layer 7C on each of the upper curved surfaces RD can be efficiently (easily) removed when removing the base layers 7C from the top surface 2T of the element body 2C'.

Next, the plating process is performed in Step S12 of the second embodiment. As shown in FIG. 5C, a plating layer 9C is formed on each of the base layers 7C. The plating layer 9C has a thickness TM. As a result, obtained is the multilayer ceramic capacitor 1C that has an external electrode 6A' on the left side surface 2P of the element body 2C and an external electrode 6B' on the right side surface 2Q of the element body 2C. The process of forming the plating layer 9C may include Cu plating, Ni plating and Sn plating that are sequentially performed. In this process, the element body 2C on which the base layers 7C are formed is placed in a barrel together with the plating solution, and the electricity is supplied to the barrel while rotating the barrel, so as to form the plating layers 9C. The plating layers 9C cover the base layers 7C respectively without protruding from the upper surface 2T of the element body 2C. The thickness TM of the plating layer 9C preferably satisfies the following condition: CE+D1−D1'−TM>0. This allows the external electrodes 6A' and 6B' not to protrude from the top surface 2T of the element body 2C, and allows the multilayer ceramic capacitor 1C to have a low profile.

Third Embodiment

A third embodiment of the invention will be described with reference to FIG. 6. In the third embodiment, the multilayer ceramic capacitor 1A of the first embodiment is mounted on a lower mounting substrate 41, and a combination of the capacitor 1A and the lower mounting substrate 41 is mounted on an upper mounting substrate 45. A combination of the capacitor 1A and the lower mounting substrate 41 may be referred to as a substrate arrangement 40. The upper mounting substrate 45 may be referred to as a motherboard. FIG. 6 shows a cross-sectional view of the substrate arrangement 40 and the motherboard 45 according to the third embodiment. The lower mounting substrate 41 has an outer face 41a and an inner face 41b. The inner face 41b may be referred to as a back face 41b. The upper mounting substrate 45 has an outer face 45a and an inner face 45b. The inner face 45b may be referred to as a back face 45b.

In FIG. 6, four land electrodes 42A, 42B, 44A and 44B are formed on the back face 41b of the mounting substrate 41. The multilayer ceramic capacitor 1A is connected to the land electrodes 42A and 42B through solder layers 43A and 43B, respectively, which are attached to the plating layers 9 of the external electrodes 6A and 6B. The solder layer 43A wets up to the left surface of the external electrode 6A but does not reach the top surface 2T of the element body 2. The solder layer 43B wets up to the right surface of the external electrode 6B but does not reach the top surface 2T of the element body 2. Thus, the upper ends of the solder layers 43A and 43B are lower than the top surface 2T of the element body 2. Solder balls 47A and 47B are formed on the land electrodes 44A and 44B disposed on the back face 41b of the mounting substrate 41, respectively.

It should be noted that although not illustrated in FIG. 6, one or more semiconductor chips are mounted on the outer face 41a of the mounting substrate 41. The semiconductor chip(s) may include a microprocessor, a semiconductor memory, an FPGA (Field-Programmable Gate Array) and/or an ASIC (Application Specific Integrated Circuit).

Land electrodes 46A and 46B are formed on the back face 45b of the upper mounting substrate 45. The upper mounting substrate 45 is connected to the lower mounting substrate 41 via the solder balls 47A and 47B. The upper mounting substrate 45 may be a motherboard, and the substrate arrangement 40 that includes the mounting substrate 41 and the capacitor 1A is mounted on the motherboard 45.

The mounting substrates 41 and 45 are spaced from each other in the height direction DS by the solder balls 47A and 47B. A resin 48 is provided between the mounting substrates 41 and 45 to encapsulate (or seal) the multilayer ceramic capacitor 1A. The resin 48 is, for example, an epoxy resin. The resin 48 may be injected and cured between the mounting boards 41 and 45 after the mounting boards 41 and 45 are connected to each other by the solder balls 47A and 47B. The resin 48 covers the multilayer ceramic capacitor 1A, the solder layers 43A, 43B and the solder balls 47A, 47B, and adheres to the top surface 2T of the element body 2.

If the surface roughness of the upper surface 2T of the element body 2 is larger than the surface roughness of the lower surface 2W of the element body 2, the adhesion between the upper surface 2T of the element body 2 and the resin 48 can be enhanced. This prevents the formation of a gap, through which moisture would enter, between the top surface 2T of the element body 2 and the resin 48, and improves the reliability of the multilayer ceramic capacitor 1A encapsulated with the resin 48.

Because the multilayer ceramic capacitor 1A is mounted on the back face 41b of the mounting substrate 41, the multilayer ceramic capacitor 1A is placed on the opposite face of the mounting substrate 41 when looked at from the semiconductor chip(s) which is mounted on the outer face 41a of the mounting substrate 41. Thus, it is possible to mount the multilayer ceramic capacitor 1A in close proximity to the semiconductor chip(s) mounted on the outer face 41a of the mounting substrate 41, thereby effectively eliminating the noise added to the semiconductor chip(s).

If the height of the multilayer ceramic capacitor 1A is 150 μm or less, the multilayer ceramic capacitor 1A is received in the spacing between the mounting boards 41 and 45, which are connected to each other via the solder balls 47A and 47B. Thus, it is possible to place the multilayer ceramic capacitor 1A on the inner face 41b of the mounting substrate 41 whereas the semiconductor chips are placed on the opposite face (outer face) 41a of the mounting substrate 41.

Because the base layers 7 have been removed from the top surface 2T of the element body 2, and the upper ends of the base layers 7 on the side surfaces 2P and 2Q of the element body 2 are lowered from the top surface 2T by an amount equal to or greater than the thickness of the plating layer 9, the plating layers 9 are not formed on the top surface 2T of the element body 2. As a result, it is possible to prevent the solder layers 43A and 43B from creeping up to the top surface 2T of the multilayer ceramic capacitor 1A over the plating layers 9. This contributes to proper disposing of the multilayer ceramic capacitor 1A in the gap between the mounting substrates 41 and 45. It should be noted that although a combination of the mounting substrate 41 and the capacitor 1A is referred to as a substrate arrangement in the foregoing, a combination of the two mounting substrates 41 and 45 and the capacitor 1A may be referred to as a substrate arrangement.

Fourth Embodiment

Figure 7:
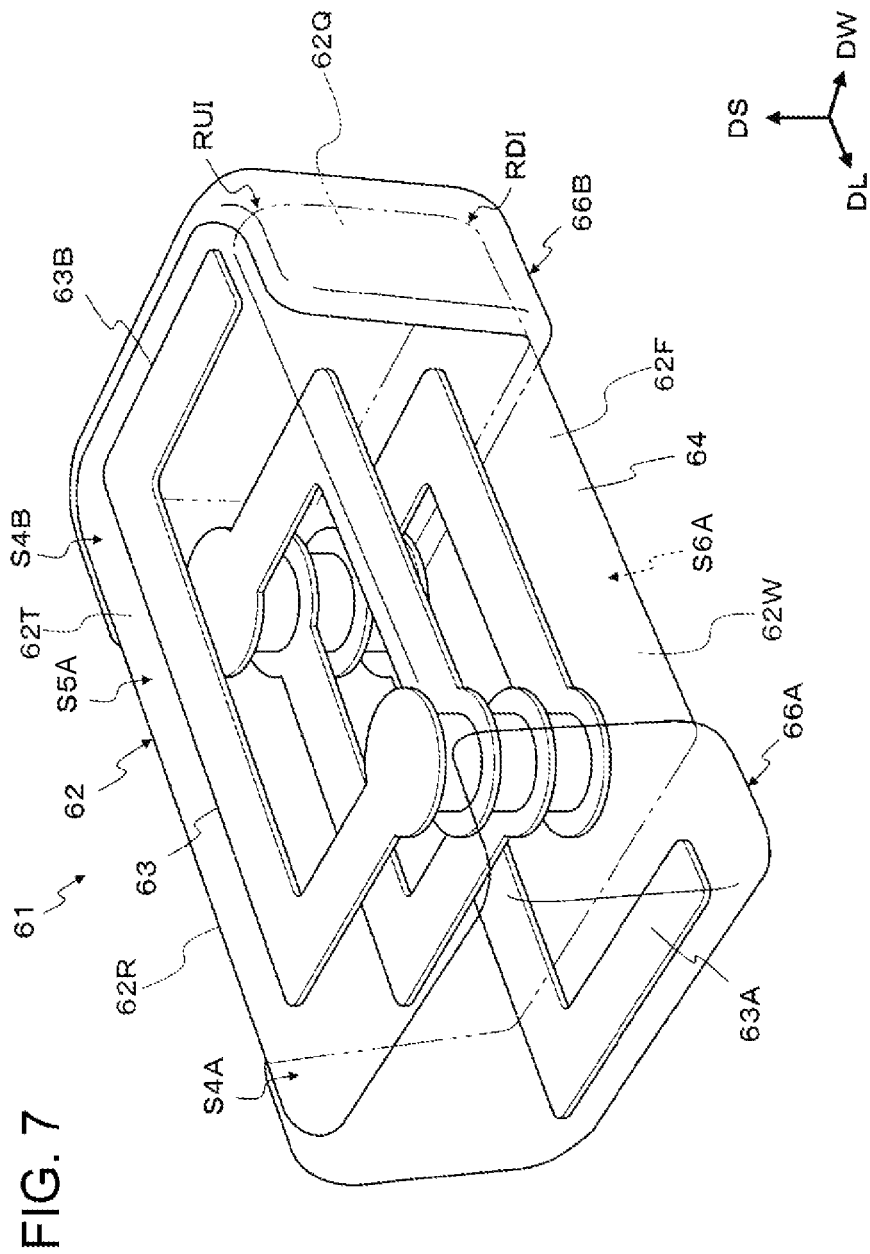
FIG. 7 is a perspective view of a ceramic electronic component according to a fourth embodiment.

Referring now to FIG. 7, a fourth embodiment of the invention will be described. FIG. 7 is a perspective view of an exemplary ceramic electronic component of the fourth embodiment. In the fourth embodiment, a chip inductor 61 will be described as an example of the ceramic electronic component.

As shown in FIG. 7, the chip inductor 61 includes an element body 62 and external electrodes 66A and 66B. The element body 62 has a coil pattern 63, internal electrode layers 63A and 63B, and a magnetic material 64. The magnetic material 64 is used as a dielectric to insulate the inner electrode layers 63A and 63B. The element body 62 may have a generally rectangular parallelepiped shape. Each of the external electrodes 66A and 66B has a structure similar to the external electrode 6A, 6B of the first embodiment. Specifically, each of the external electrodes 66A and 66B has a base layer formed on the element body 62 and a plating layer formed on the base layer. The base layer may be made from a combination of a metal and a co-material. The co-material is, for example, a ferrite component that is the main component of the magnetic material 64.

The element body 62 is chamfered along the ridges of the element body 62. A curved surface RDI is formed along the lower right ridge between the bottom surface 62W and the right side surface 62Q of the element body 62. Another curved surface RDI is formed along the lower left ridge between the bottom surface 62W and the left side surface of the element body 62. Similarly, a curved surface RUI is formed along the upper right ridge between the top surface 62T and the right side surface 62Q of the element body 62. Another curved surface RUI is formed along the upper left ridge between the top surface 62T and the left side surface of the element body 62. The shape of the curved surface RDI is different from the shape of the curved surface RUI. The radius of curvature of the curved surface RUI may be different from the radius of curvature of the curved surface RDI.

The upper surface 62T of the element body 62 has a left end region S4A, an intermediate region S5A and a right end region S4B arranged in the length direction DL of the element body 62. The left end region S4A is defined in the left area of the upper surface 62T of the element body 62, and the right end region S4B is defined in the right area of the upper surface 62T of the element body 62. The left end region S4A may be provided at a position opposite the base layer of the external electrode 66A on the bottom surface 62W of the element body 62. The right end region S4B may be provided at a position opposite the base layer of the external electrode 66B on the bottom surface 62W of the element body 62. The end regions S4A and S4B are formed by removing the base layers of the external electrodes 66A and 66B from the upper surface 62T of the element body 62. The intermediate region S5A is the region located between the end regions S4A and S4B.

The surface roughness of the element body 62 in the end regions S4A and S4B is greater than the surface roughness of the element body 62 in the intermediate region S5A. The surface roughness of the intermediate region S5A is greater than the surface roughness of the lower surface region S6A on the bottom surface 62W of the element body 62. The lower surface region S6A is the area between the base layers of the external electrodes 66A and 66B on the bottom surface 62W of the element body 62. The intermediate region S5A is subjected to the ion impact when the base layers on the upper surface 62T of the element body 62 are removed. The lower surface region S6A is not subject to the ion impact when the base layers on the upper surface 62T of the element body 62 are removed.

The coil pattern 63 and the internal electrode layers 63A and 63B are generally covered with the magnetic material 64. It should be noted, however, that the left end of the internal electrode layer 63A extends out of the magnetic material 64 from the left surface of the element body 62 and connected to the external electrode 66A. Similarly, the right end of the internal electrode layer 63B extends out of the magnetic material 64 from the other surface (right surface 62Q) of the element body 62 and is connected to the external electrode 66B.

The materials of the coil pattern 63 and the inner electrode layers 63A and 63B may be a metal such as Cu, Ni, Ti, Ag, Au, Pt, Pd, Ta or W, for example, or an alloy containing these metals. The magnetic material 64 is, for example, ferrite.

The external electrode 66A is provided on the left surface of the element body 62 and the external electrode 66B is provided on the opposite surface (right surface 62Q) of the element body 62. The external electrode 66A is separated from the external electrode 66B in the length direction DL of the element body 62. Each of the external electrodes 66A and 66B is formed on the respective side surface of the element body 62 and extends to the front surface 62T, the rear surface 62R and the bottom surface 62W of the element body 62. The external electrodes 66A and 66B are not formed on the top surface 62T of the element body 62. In other words, the upper ends of the external electrodes 66A and 66B are lower than the top surface 62T of the element body 62. Each of the external electrodes 66A and 66B is continuous from the bottom surface 62W to the respective side surface over the respective cured surface RDI of the element body 62. The respective side surface of the element body 62 is vertical relative to the bottom surface 62W. The upper end of each of the external electrodes 66A and 66B is situated on the respective upper curved surface RUI of the element body 62. The lower curved surfaces RDI of the element body 62 are covered with the external electrodes 66A and 66B, respectively. The thickness of each of the external electrodes 66A and 66B is, for example, between 10 μm and 40 μm.

The external size of the chip inductor 61 may satisfy a condition that the length is larger than the width, and the width is larger than the height (length>width>height), or a condition that the length is larger than the width, and the width is equal to the height (length>width=height). In order to provide the chip inductor 61 having a low profile (low height), the height of the chip inductor 61 is preferably equal to or smaller than 150 μm.

EXAMPLES

A real sample of a multilayer ceramic capacitor will be described below with reference to FIG. 5A to FIG. 5C, and FIGS. 8A, 8B, 9A and 9B. Prepared was the multilayer ceramic capacitor 1C shown in FIG. 5C. The thickness T1 of the element body 2C was 50 μm. The thicknesses TA of the lower cover layer 5A was 10 μm, and the thickness TB of the upper cover layer 5B was also 10 μm. The four curved surfaces RD were formed on the element body 2C' in FIG. 5A by barrel polishing. The radius of curvature CD of each curved surface RD was 4 μm. Then, the conductive paste for the base layers was applied onto the two side faces 2P and 2Q of the element body 2C' and certain areas of the remaining four faces (top face 2T, the bottom face 2W, the front face 2F, and the rear face 2R) of the element body 2C', which are adjacent to the respective side faces 2P and 2Q of the element body 2C', by the dipping method. Subsequently, the element body 2C' underwent the sintering such that the base layers 7C were integrated to the element body 2C'.

The thickness D1 of each of the base layers 7C was set to 3 µm to cause the wet conductive paste for the base layers to sufficiently spread over the two side faces 2P and 2Q and the adjacent areas on the remaining four faces of the element body 2C' and allow the ion impact to sufficiently remove the base layers 7C from the top face 2T of the element body 2C'.

When the thickness T1 of the element body 2C is equal to or less than 50 µm, the movement of the wet conductive paste for the base layers is influenced by the surface tension. Specifically, the wet conductive paste for the base layers tends to spread over the two side faces 2P and 2Q and the adjacent areas on the remaining four faces of the element body 2C' rather than spreading to other areas of the element body 2C'. Thus, the thickness of the wet conductive paste becomes thin on the four curved surfaces RD of the element body 2C'. In this example, the thickness D1 of the base layer (conductive paste) on each of the side faces 2P and 2Q and the adjacent areas on the remaining four faces of the element body 2C' was 3 µm, and the thickness D1' of the base layer on each of the curved surfaces RD of the element body 2C' was 2 µm. It was confirmed that the base layers 7C were efficiently removed from the curved surfaces RD of the element body 2C' by the ion milling.

Next, the base layers 7C on the top face 2T of the element body 2C' were removed by the ion milling using Ar (Argon) and other materials. The processing time of the ion milling was decided (adjusted) such that each of the base layers 7C on the top face 2T of the element body 2C' was removed by an amount equal to the thickness D1. As shown in FIG. 5B, as a result of this ion milling, the upper end of each of the base layers 7C on the respective side face 2P, 2Q of the element body 2C was lowered by an amount of CE+D1−D1' from the top surface 2T of the element body 2C. In this example, RE was 4 µm, D1 was 3 µm, D1' was 2 µm, and the height of the base layer 7C was lowered by 5 µm relative to the top face 2T of the element body 2C. If the base layers 7C on the top face 2T of the element body 2C were removed, the thickness D1' can be determined by using the base layers 7C in the vicinity of the bottom face 2W of the element body 2C.

The thickness D1' of the base layer 7C on the curved surface RD of the element body 2C' is smaller than the thickness D1 of the base layer 7C on the top surface 2T of the element body 2C'. Thus, when the ion milling is performed to remove the base layers 7C by the thickness D1, the upper curved surfaces RD of the element body 2C' are also subjected to the ion milling and certain portions of the cover layer 5B are removed. As a result, the upper curved surfaces RD of the element body 2C' change to the curved surfaces RE.

Next, the plating layer 9C was formed on each of the base layers 7C by the plating process to form the external electrode 6A', 6B' as shown in FIG. 5C. The height of each of the external electrodes 6A' and 6B' is lower than the top surface 2T of the element body 2C by the amount of CE+D1−D1'−TM. The thickness TM of the plating layer 9C preferably satisfies the condition of CE+D1−D1'−TM>0 so that the external electrodes 6A' and 6B' do not extend over the upper surface 2T of the element body 2C. In this example, the thickness TM of the plating layer 9C was 1 µm.

In this example, CE was 4 µm, D1 was 3 µm, D1' was 2 µm, and TM was 1 µm. Thus, the height of each of the external electrodes 6A' and 6B' was 4 µm lower than the top surface 2T of the element body 2C. Accordingly, the external electrodes 6N and 6B' do not protrude from the top surface 2T of the element body 2C. In this manner, a low-profile multilayer ceramic capacitor 1C was manufactured.

Then, the surface roughness of the top surface 2T of the element body 2C of the multilayer ceramic capacitor 1C was evaluated. The evaluation of the surface roughness will be described with reference to FIGS. 8A-8B, FIGS. 9A-9B and FIGS. 10A-10B.

Figure 8A:
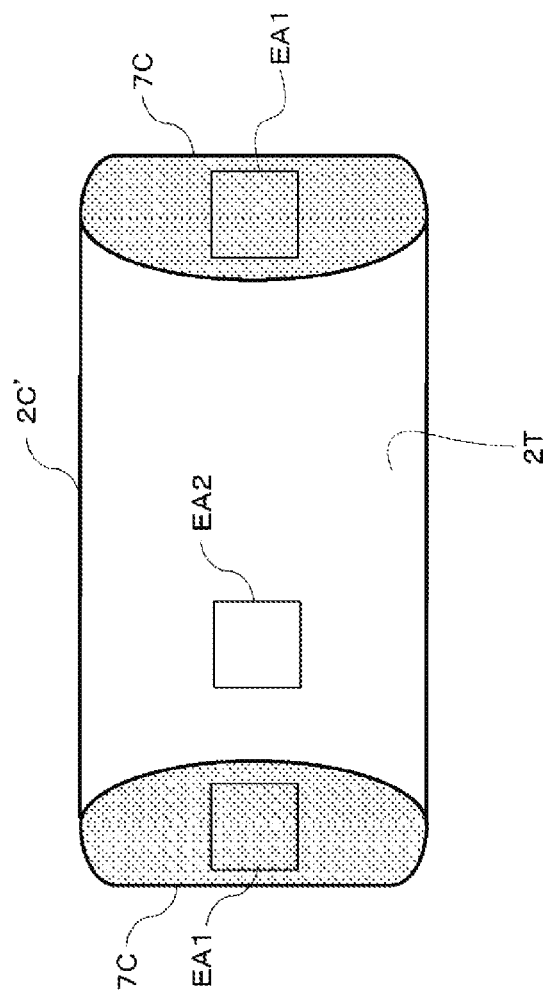
FIG. 8A is a plan view of the element body of the multilayer ceramic capacitor to show a pair of first evaluation areas of surface roughness of the base layers on the top surface of the element body prior to ion milling together with another evaluation area.

FIG. 8A is a plan view of the element body 2C' and shows a pair of first evaluation areas EA1 and EA1 of the surface roughness of the two base layers on the upper surface 2T of the element body 2C' prior to the ion milling together with another evaluation area EA2. FIG. 8B show the evaluations areas EB1, EB1 and EB2 after the ion milling Specifically, FIG. 8B shows the element body 2C and shows the first evaluation areas EB1 and EB1 of the surface roughness in the traces 2E of the base layers on the upper surface 2T of the element body 2C after the ion milling together with another evaluation area EB2. The left shaded area 2E in FIG. 8B corresponds to the left end area S1A shown in FIG. 2A, and the right shaded area 2E in FIG. 8B corresponds to the right end area S1B shown in FIG. 2A. FIG. 9A is similar to FIG. 8A but shows another pair of evaluation areas (second evaluation areas) EC1 and EC1 of the surface roughness of the base layers on the top surface 2T of the element body 2C' prior to the ion milling together with another evaluation area EC2. FIG. 9B shows the two evaluation areas ED1 and ED1 after the ion milling to measure the surface roughness in the traces 2E of the base layers on the upper surface 2T of the element body 2C after the ion milling together with another evaluation area ED2. The left shaded area 2E in FIG. 9B corresponds to the left end area S1A shown in FIG. 2A, and the right shaded area 2E in FIG. 9B corresponds to the right end area S1B shown in FIG. 2A. In FIG. 8A and FIG. 8B, the size of each of the evaluation areas EA1, EA2, EB1 and EB2 was 50 µm×50 µm. In FIG. 9A and FIG. 9B, the size of each of the evaluation areas was made as large as possible on the top surface 2T of the element body.

As shown in FIG. 8A, the first evaluation areas EA1 were set on the base layers 7C respectively and the third evaluation area EA2 was set on the top surface 2T of the element body 2C' prior to performing the ion milling to the base layers 7C on the top surface 2T of the element body 2C'. The surface roughness Sa of each of the first evaluation areas EA1 was 0.280 µm and the surface roughness Sa of the third evaluation area EA2 was 0.038 µm.

Referring to FIG. 9A, the second evaluation areas EC1 were set on the base layers 7C respectively before performing the ion milling to the base layers 7C on the top surface 2T of the element body 2C', and the fourth evaluation area EC2 was set on the top surface 2T of the element body 2C'. The surface roughness Sa of each of the second evaluation areas EC1 was 0.293 µm and the surface roughness Sa of the fourth evaluation area EC2 was 0.062 µm.

The surface roughness of the upper surface 2T of the element body 2C prior to the ion milling is almost equal to the surface roughness of the lower surface 2W of the element body 2C after ion milling the base layers 7C on the upper surface 2T of the element body 2C. In practice, therefore, the surface roughness of the upper surface 2T of the element body 2C prior to the ion milling was evaluated with the surface roughness of the lower surface 2W of the element body 2C after ion milling the base layers 7C on the upper surface 2T of the element body 2C.

FIG. 8B illustrates the element body after the ion milling. In FIG. 8B, the base layers 7C have been removed from the top surface 2T of the element body 2C' by the ion milling After the removal of the base layers 7C, traces 2E of the base layers 7C were formed on the element body 2C. Then, the evaluation area EB1 was set in each of the base layer traces 2E of the element body 2C, and the evaluation area EB2 was set on the element body 2C between the base layer traces 2E. The surface roughness Sa of each of the evaluation areas EB1 was 0.385 µm and the surface roughness Sa of the evaluation area EB2 was 0.086 µm.

FIG. 9B illustrates the element body after the ion milling. In FIG. 9B, the evaluation area ED1 was set in each of the substrate traces 2E of the element body 2C, and the evaluation area ED2 was set on the element body 2C between the base layer traces 2E. The surface roughness Sa of each of the evaluation areas ED1 was 0.382 µm, and the surface roughness Sa of the evaluation area ED2 was 0.102 µm.

From the above-mentioned results, it was confirmed that the surface roughness Sa of each of the base layer traces 2E was more than twice as large as the surface roughness Sa on the element body 2C between the base layer traces 2E (i.e., the surface roughness of the evaluation area EB2, ED2) although there were some variations in the surface roughness Sa depending on the size of the evaluation area. It was also confirmed that there was a difference of between 0.04 µm and 0.05 µm in the surface roughness Sa between the upper surface 2T and the lower surface 2W of the element body 2C.

The surface roughness of the base layer 7C on the upper surface 2T of the element body 2C before applying the ion milling may be evaluated with the surface roughness of the base layer 7C on the lower surface 2W of the element body 2C after applying the ion milling to the base layers 7C on the upper surface 2T of the element body 2C. The surface roughness of the upper surface 2T of the element body 2C before applying the ion milling may be evaluated with the surface roughness of the lower surface 2W of the element body 2C after applying the ion milling to the base layers 7C on the upper surface 2T of the element body 2C.

Figure 10A:
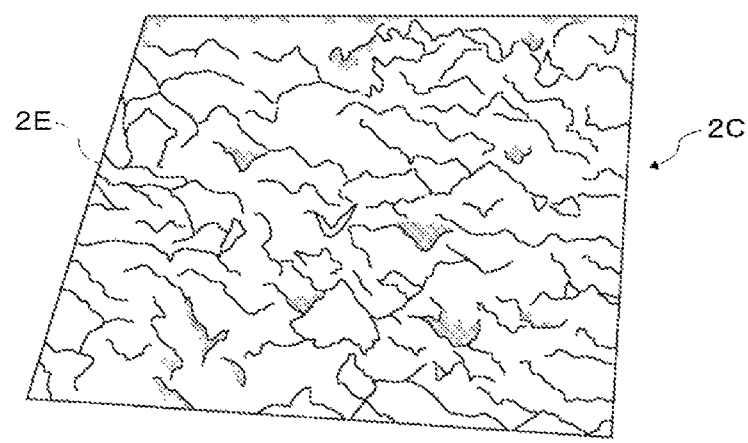
FIG. 10A is a plan view of an observed surface roughness in the end region of the element body of the multilayer ceramic capacitor.
Figure 10B:
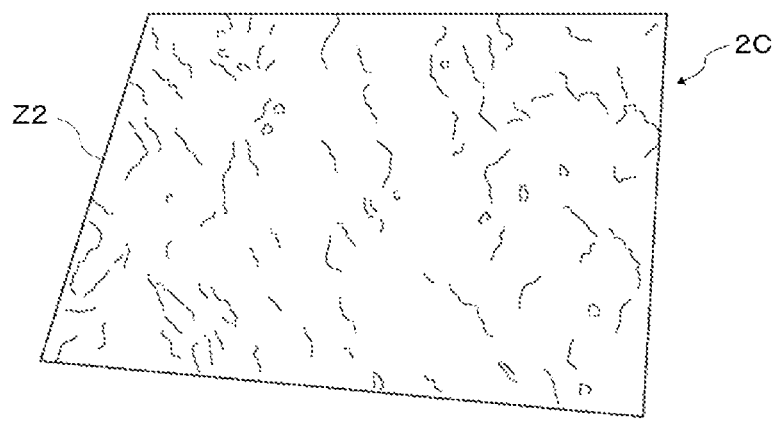
FIG. 10B is a plan view of an observed surface roughness in the intermediate region of the element body of the multilayer ceramic capacitor.

FIG. 10A is a schematic plan view showing an example of observation of the surface roughness in the base layer traces 2E (i.e., the end regions S1A and S1B) of the element body 2C of the multilayer ceramic capacitor 1C. FIG. 10B is a schematic plan view showing an example of observation of the surface roughness in the intermediate region Z2 of the top surface 2T (area between the base layer traces 2E, which corresponds to the intermediate region S2A shown in FIG. 2A) of the element boy 2C of the multilayer ceramic capacitor 1C. For example, a laser microscope may be used to observe the surface roughness of the element body 2C.

It was confirmed from the comparison between FIG. 10A and FIG. 10B that the surface roughness of the end region 2E was greater than that of the intermediate region Z2. The end region 2E corresponds to, for example, the evaluation area EB1 in FIG. 8B, and the intermediate region Z2 corresponds to, for example, the evaluation area EB2 in FIG. 8B.

For example, images of the surface of the element body were captured by the laser microscope and an imaging device, and the captured images may be used to evaluate the surface roughness of the element body. If quantitative evaluation of the surface roughness is carried out using the images of the surface of the element body, a deep learning approach may be employed. For example, a learned model may be generated by training a neural network with a data set that includes the surface roughness Sa measured in advance and images captured in advance in a learning phase. Then, the images are entered to the learned model in an inference phase to calculate the surface roughness Sa. The calculated surface roughness Sa is the quantitative evaluation of the surface roughness using the images of the surface of the element body.

It will be apparent to those skilled in the art that various modifications and variations can be made in the present invention without departing from the spirit or scope of the invention. Thus, it is intended that the present invention encompasses modifications and variations that come within the scope of the appended claims and their equivalents. In particular, it is explicitly contemplated that any part or whole of any two or more of the embodiments and their modifications described above can be combined and regarded within the scope of the present invention.

What is claimed is:

1. A ceramic electronic component comprising:
   an element body including a dielectric and at least one internal electrode therein, the element body having a plurality of surfaces, the plurality of surfaces including a first surface and a second surface opposite the first surface, with two end regions being defined on the second surface at opposite ends of the second surface and an intermediate region being defined on the second surface between the two end regions and having a surface roughness smaller than each of the two end regions; and
   at least one external electrode formed on the element body at a position away from the second surface, each of the at least one external electrode including a base layer formed on the element body and a plating layer formed on the base layer, the base layer being connected to one or more of the at least one internal electrode and containing at least one metal,
   wherein the base layer is formed on at least two surfaces of the plurality of surfaces of the element body except the second surface.

2. The ceramic electronic component according to claim 1, wherein a thickness of the element body is defined by a distance between the first surface and the second surface, and the thickness of the element body under the intermediate region of the second surface is smaller than the thickness of the element body under the end regions of the second surface.

3. The ceramic electronic component according to claim 1, wherein the plurality of surfaces of the element body includes a third surface that extends perpendicularly from the first surface, a first corner is defined between the first surface and the third surface, the base layer is formed on the first and third surfaces such that the base layer continuously extends from the first surface to the third surface, and a thickness of the base layer at the first corner is smaller than a thickness of the base layer on the first and third surfaces of the element body.

4. The ceramic electronic component according to claim 1, wherein a surface roughness of each of the end regions of the second surface is between two and five times greater than the surface roughness of the intermediate region of the second surface.

5. The ceramic electronic component according to claim 1, wherein a surface roughness of each of the end regions of the second surface is between 0.25 µm and 0.8 µm, and the surface roughness of the intermediate region of the second surface is between 0.05 µm and 0.3 µm.

6. The ceramic electronic component according to claim 1, wherein the surface roughness of the intermediate region of the second surface is greater than a surface roughness of the first surface of the element body.

7. The ceramic electronic component according to claim 6, wherein the surface roughness of the intermediate region of the second surface is equal to or greater than twice a surface roughness of the first surface of the element body.

8. The ceramic electronic component according to claim 1, wherein the base layer is formed on the first surface of the element body, and a thickness of the element body from the second surface to the base layer on the first surface is 150 μm or less.

9. The ceramic electronic component according to claim 1, wherein a thickness of the base layer is between 3 μm and 6 μm.

10. The ceramic electronic component according to claim 1, wherein the at least one internal electrode includes at least one first internal electrode layer and at least one second internal electrode layer,
the element body is a laminate that includes the at least one first internal electrode layer and the at least one second internal electrode layer alternately stacked via dielectric layers, each of the dielectric layers containing the dielectric,
the at least one external electrode includes a first external electrode and a second external electrode,
the plurality of surfaces of the element body include two opposite surfaces that are perpendicular to both the first and second surfaces, the first external electrode is provided on one of the two opposite surfaces and the second external electrode is provided on the other of the two opposite surfaces,
the at least one first internal electrode layer is connected to the first external electrode, and
the at least one second internal electrode layer is connected to the second external electrode.

11. The ceramic electronic component according to claim 10, wherein the laminate includes cover layers that contain the dielectric and cover the at least one first and second internal electrodes stacked via the dielectric layers, and a thickness of each of the cover layers is between 5 μm and 30 μm.

12. A substrate arrangement comprising:
a mounting substrate; and
the ceramic electronic component as set forth in claim 1, mounted on the mounting substrate via at least one solder layer,
wherein the at least one solder layer is wetted up onto the at least one external electrode without reaching the second surface of the element body.

13. The substrate arrangement according to claim 12 further comprising:
a resin that encapsulates and seals the ceramic electronic component on the mounting substrate; and
at least one solder ball provided on the mounting substrate at a location different from where the ceramic electronic component is mounted.

14. A ceramic electronic component comprising:
an element body including a dielectric and at least one internal electrode therein, the element body having a plurality of surfaces, the plurality of surfaces including a first surface and a second surface opposite the first surface, with two end regions being defined on the second surface at opposite ends of the second surface and an intermediate region being defined on the second surface between the two end regions and having a surface roughness smaller than each of the two end regions; and
at least one external electrode formed on the element body at a position away from the second surface, each of the at least one external electrode including a base layer formed on the element body and a plating layer formed on the base layer, the base layer being connected to one or more of the at least one internal electrode and containing at least one metal,
wherein the base layer is formed on the element body at a position that does not allow the plating layer to reach the second surface of the element body.

15. The ceramic electronic component according to claim 14, wherein the plurality of surfaces of the element body includes a third surface that extends perpendicularly from the first surface, a first corner is defined between the first surface and the third surface, the base layer is formed on the first and third surfaces such that the base layer continuously extends from the first surface to the third surface, and a thickness of the base layer at the first corner is smaller than a thickness of the base layer on the first and third surfaces of the element body.

16. The ceramic electronic component according to claim 14, wherein the surface roughness of the intermediate region of the second surface is greater than a surface roughness of the first surface of the element body.

17. The ceramic electronic component according to claim 16, wherein the surface roughness of the intermediate region of the second surface is equal to or greater than twice a surface roughness of the first surface of the element body.

18. A ceramic electronic component comprising:
an element body including a dielectric and at least one internal electrode therein, the element body having a plurality of surfaces, the plurality of surfaces including a first surface and a second surface opposite the first surface, with two end regions being defined on the second surface at opposite ends of the second surface and an intermediate region being defined on the second surface between the two end regions and having a surface roughness smaller than each of the two end regions; and
at least one external electrode formed on the element body at a position away from the second surface, each of the at least one external electrode including a base layer formed on the element body and a plating layer formed on the base layer, the base layer being connected to one or more of the at least one internal electrode and containing at least one metal,
wherein the surface roughness of the intermediate region of the second surface is greater than a surface roughness of the first surface of the element body.

19. The ceramic electronic component according to claim 18, wherein a thickness of the element body is defined by a distance between the first surface and the second surface, and the thickness of the element body under the intermediate region of the second surface is smaller than the thickness of the element body under the end regions of the second surface.

20. The ceramic electronic component according to claim 18, wherein the plurality of surfaces of the element body includes a third surface that extends perpendicularly from the first surface, a first corner is defined between the first surface and the third surface, the base layer is formed on the first and third surfaces such that the base layer continuously extends from the first surface to the third surface, and a thickness of the base layer at the first corner is smaller than a thickness of the base layer on the first and third surfaces of the element body.

* * * * *